US008893179B2

(12) United States Patent
Charlebois et al.

(10) Patent No.: US 8,893,179 B2
(45) Date of Patent: Nov. 18, 2014

(54) APPARATUS AND METHODS FOR PROVIDING AND PRESENTING CUSTOMIZED CHANNEL INFORMATION

(75) Inventors: Mark Charlebois, San Diego, CA (US); Bruce Collins, San Diego, CA (US); Gordon Kent Walker, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1073 days.

(21) Appl. No.: 11/270,166

(22) Filed: Nov. 8, 2005

(65) Prior Publication Data

US 2007/0073834 A1    Mar. 29, 2007

Related U.S. Application Data

(60) Provisional application No. 60/716,408, filed on Sep. 12, 2005.

(51) Int. Cl.
*G06F 3/00* (2006.01)
*G06F 13/00* (2006.01)
*H04N 5/445* (2011.01)
*G06F 17/30* (2006.01)

(52) U.S. Cl.
CPC ...... *G06F 17/3002* (2013.01); *G06F 17/30056* (2013.01)
USPC .......................................................... 725/40

(58) Field of Classification Search
CPC .............. H04N 21/20; H04N 21/2143; H04N 21/2343; H04N 21/4131; H04N 21/238; H04N 21/239; H04N 21/242; H04N 21/25262; H04N 21/23617

USPC ............... 725/37–40, 47, 91, 109, 34, 35, 46, 725/132, 14, 87, 119, 141; 709/217
See application file for complete search history.

(56) References Cited

U.S. PATENT DOCUMENTS

| 4,600,921 | A | 7/1986 | Thomas |
| 5,491,774 | A | 2/1996 | Norris et al. |
| 5,604,528 | A | 2/1997 | Edward et al. |
| 5,652,759 | A | 7/1997 | Stringfello, Jr. |

(Continued)

FOREIGN PATENT DOCUMENTS

| CA | 2548227 A1 | 6/2005 |
| CN | 1212577 A | 3/1999 |

(Continued)

OTHER PUBLICATIONS

Das, S., "STAR News Goes Pay, to Attract Flat Rate of Rs 2," Financial Express, Aug. 4, 1999.

(Continued)

*Primary Examiner* — Nasser Goodarzi
*Assistant Examiner* — An Nguyen
(74) *Attorney, Agent, or Firm* — The Marbury Law Group, PLLC

(57) ABSTRACT

Apparatus and methods for providing and presenting customized channel information include receiving service attribute information corresponding to a base service, where the base service is operable to provide at least a portion of a presentation to a device. The apparatus and methods further include customizing the service attribute information, and providing channel information to the device. The channel information comprising the customized service attribute information, thereby providing a custom view of a channel.

108 Claims, 16 Drawing Sheets

(56) References Cited

U.S. PATENT DOCUMENTS

| | | |
|---|---|---|
| 5,659,350 A | 8/1997 | Hendricks et al. |
| 5,696,500 A | 12/1997 | Diem |
| 5,717,923 A | 2/1998 | Dedrick |
| 5,805,763 A | 9/1998 | Lawler et al. |
| 5,978,649 A | 11/1999 | Kahn |
| 6,016,141 A | 1/2000 | Knudson et al. |
| 6,075,526 A | 6/2000 | Rothmuller |
| 6,088,722 A | 7/2000 | Herz et al. |
| 6,122,658 A | 9/2000 | Chaddha |
| 6,230,203 B1 | 5/2001 | Koperda et al. |
| 6,314,573 B1 | 11/2001 | Gordon et al. |
| 6,442,598 B1 | 8/2002 | Wright et al. |
| 6,477,707 B1 | 11/2002 | King et al. |
| 6,505,347 B1 | 1/2003 | Kaneko et al. |
| 6,536,041 B1 | 3/2003 | Knudson et al. |
| 6,587,835 B1 | 7/2003 | Treyz et al. |
| 6,594,682 B2 | 7/2003 | Peterson et al. |
| 6,614,573 B1 | 9/2003 | Cao |
| 6,654,423 B2 | 11/2003 | Jeong et al. |
| 6,671,853 B1 | 12/2003 | Burkett et al. |
| 6,678,215 B1 | 1/2004 | Treyz et al. |
| 6,704,930 B1 | 3/2004 | Eldering et al. |
| 6,729,929 B1 | 5/2004 | Sayers et al. |
| 6,785,551 B1 | 8/2004 | Richard |
| 6,820,277 B1 | 11/2004 | Eldering et al. |
| 6,857,012 B2 | 2/2005 | Sim et al. |
| 6,863,557 B2 | 3/2005 | Mills et al. |
| 6,886,017 B1 | 4/2005 | Jackson et al. |
| 6,895,486 B2 | 5/2005 | Wong et al. |
| 6,895,595 B2 | 5/2005 | Goodman et al. |
| 6,918,132 B2 | 7/2005 | Gargi |
| 6,970,928 B2 | 11/2005 | Ihara et al. |
| 6,975,835 B1 | 12/2005 | Lake et al. |
| 6,983,327 B2 | 1/2006 | Koperda et al. |
| 7,003,117 B2 | 2/2006 | Kacker et al. |
| 7,017,174 B1 | 3/2006 | Sheedy |
| 7,043,225 B1 | 5/2006 | Patel et al. |
| 7,053,958 B2 | 5/2006 | Collins et al. |
| 7,085,291 B2 | 8/2006 | Zhang et al. |
| 7,093,754 B2 | 8/2006 | Sako |
| 7,113,776 B2 | 9/2006 | Minear et al. |
| 7,117,439 B2 | 10/2006 | Barrett et al. |
| 7,120,932 B2 | 10/2006 | Lockhart et al. |
| 7,149,189 B2 * | 12/2006 | Huntington et al. ........... 370/235 |
| 7,194,756 B2 | 3/2007 | Addington et al. |
| 7,257,634 B2 | 8/2007 | Colby et al. |
| 7,305,074 B2 | 12/2007 | Hartung et al. |
| 7,376,964 B1 | 5/2008 | Kim |
| 7,386,871 B1 | 6/2008 | Knudson et al. |
| 7,424,708 B2 | 9/2008 | Andersson et al. |
| 7,448,063 B2 | 11/2008 | Freeman et al. |
| 7,586,938 B2 | 9/2009 | Klemets et al. |
| 7,600,245 B2 | 10/2009 | Steading et al. |
| 7,620,574 B2 | 11/2009 | Buehl et al. |
| 7,830,833 B2 | 11/2010 | Walker et al. |
| 2001/0037238 A1 | 11/2001 | Gotoh et al. |
| 2001/0052133 A1 | 12/2001 | Pack et al. |
| 2002/0016801 A1 | 2/2002 | Reiley et al. |
| 2002/0042915 A1 | 4/2002 | Kubischta et al. |
| 2002/0053078 A1 * | 5/2002 | Holtz et al. ...................... 725/14 |
| 2002/0054146 A1 | 5/2002 | Fukumoto et al. |
| 2002/0059603 A1 | 5/2002 | Kelts |
| 2002/0083442 A1 | 6/2002 | Eldering |
| 2002/0124259 A1 | 9/2002 | Chang et al. |
| 2002/0144291 A1 | 10/2002 | Smiley et al. |
| 2002/0157002 A1 | 10/2002 | Messerges et al. |
| 2002/0188663 A1 | 12/2002 | Islam et al. |
| 2002/0194599 A1 | 12/2002 | Mountain |
| 2003/0026231 A1 | 2/2003 | Lazaridis et al. |
| 2003/0037331 A1 | 2/2003 | Lee |
| 2003/0040850 A1 | 2/2003 | Najmi et al. |
| 2003/0069881 A1 | 4/2003 | Huttunen |
| 2003/0072257 A1 | 4/2003 | Ikedo et al. |
| 2003/0100326 A1 | 5/2003 | Grube et al. |
| 2003/0110297 A1 | 6/2003 | Tabatabai et al. |
| 2003/0117445 A1 | 6/2003 | Hendricks et al. |
| 2003/0154492 A1 | 8/2003 | Falvo et al. |
| 2003/0187916 A1 | 10/2003 | Dettinger et al. |
| 2003/0189587 A1 | 10/2003 | White et al. |
| 2003/0191816 A1 * | 10/2003 | Landress et al. ............... 709/219 |
| 2003/0212999 A1 | 11/2003 | Cai |
| 2003/0226151 A1 | 12/2003 | Hamada et al. |
| 2003/0233561 A1 | 12/2003 | Ganesan et al. |
| 2004/0003405 A1 | 1/2004 | Boston et al. |
| 2004/0024809 A1 | 2/2004 | Edwards et al. |
| 2004/0025179 A1 | 2/2004 | Russ et al. |
| 2004/0028049 A1 | 2/2004 | Wan |
| 2004/0031049 A1 | 2/2004 | Suzuki et al. |
| 2004/0039916 A1 | 2/2004 | Aldis et al. |
| 2004/0040039 A1 | 2/2004 | Bernier |
| 2004/0043763 A1 | 3/2004 | Minear et al. |
| 2004/0083492 A1 | 4/2004 | Goode et al. |
| 2004/0117822 A1 * | 6/2004 | Karaoguz et al. ................ 725/37 |
| 2004/0117831 A1 | 6/2004 | Ellis et al. |
| 2004/0117857 A1 | 6/2004 | Bisdikian et al. |
| 2004/0153547 A1 | 8/2004 | Trossen |
| 2004/0167858 A1 | 8/2004 | Erickson |
| 2004/0177383 A1 | 9/2004 | Martinolich et al. |
| 2004/0193545 A1 | 9/2004 | Shlasky |
| 2004/0194135 A1 | 9/2004 | Kahn |
| 2004/0216158 A1 | 10/2004 | Blas |
| 2004/0226048 A1 | 11/2004 | Alpert et al. |
| 2004/0236854 A1 | 11/2004 | Roy et al. |
| 2004/0261114 A1 | 12/2004 | Addington et al. |
| 2004/0268420 A1 | 12/2004 | Addington et al. |
| 2005/0010653 A1 | 1/2005 | McCanne |
| 2005/0015765 A1 | 1/2005 | Covell et al. |
| 2005/0015803 A1 | 1/2005 | MacRae et al. |
| 2005/0015804 A1 | 1/2005 | Lajoie et al. |
| 2005/0078677 A1 | 4/2005 | Benting et al. |
| 2005/0081159 A1 * | 4/2005 | Gupta et al. .................... 715/751 |
| 2005/0085183 A1 | 4/2005 | Lee |
| 2005/0090235 A1 | 4/2005 | Vermola et al. |
| 2005/0108770 A1 | 5/2005 | Karaoguz |
| 2005/0120369 A1 | 6/2005 | Matz |
| 2005/0132207 A1 | 6/2005 | Mourad |
| 2005/0154679 A1 | 7/2005 | Bielak |
| 2005/0160456 A1 | 7/2005 | Moskowitz |
| 2005/0160465 A1 | 7/2005 | Walker |
| 2005/0182852 A1 * | 8/2005 | Tinsley et al. ................. 709/238 |
| 2005/0188403 A1 | 8/2005 | Kotzin |
| 2005/0244148 A1 | 11/2005 | Tsumagari et al. |
| 2005/0264704 A1 | 12/2005 | Leinonen |
| 2005/0276246 A1 | 12/2005 | Walker et al. |
| 2006/0031882 A1 | 2/2006 | Swix et al. |
| 2006/0059045 A1 | 3/2006 | Babbar et al. |
| 2006/0095410 A1 * | 5/2006 | Ostrover et al. .................... 707/3 |
| 2006/0107282 A1 | 5/2006 | De Heer |
| 2006/0112182 A1 | 5/2006 | Chen et al. |
| 2006/0136905 A1 | 6/2006 | Thissen et al. |
| 2006/0171390 A1 | 8/2006 | La Joie |
| 2006/0200745 A1 | 9/2006 | Furmanski et al. |
| 2006/0205395 A1 | 9/2006 | Barone et al. |
| 2006/0212943 A1 | 9/2006 | Kitazato et al. |
| 2006/0218590 A1 | 9/2006 | White |
| 2006/0277576 A1 | 12/2006 | Acharya et al. |
| 2007/0055629 A1 | 3/2007 | Walker et al. |
| 2007/0061860 A1 | 3/2007 | Walker et al. |
| 2007/0067597 A1 | 3/2007 | Chen et al. |
| 2007/0074240 A1 | 3/2007 | Addington et al. |
| 2007/0078944 A1 | 4/2007 | Charlebois et al. |
| 2007/0104220 A1 | 5/2007 | Charlebois |
| 2007/0106522 A1 | 5/2007 | Collins |
| 2007/0115929 A1 | 5/2007 | Collins et al. |
| 2007/0117536 A1 | 5/2007 | Walker et al. |
| 2008/0194196 A1 | 8/2008 | Angelhag et al. |
| 2008/0263599 A1 | 10/2008 | Knudson et al. |
| 2009/0125952 A1 | 5/2009 | Chen et al. |

(56) References Cited

U.S. PATENT DOCUMENTS

| | | |
|---|---|---|
| 2009/0150922 A1 | 6/2009 | Russ et al. |
| 2010/0154000 A1 | 6/2010 | MacRae et al. |

FOREIGN PATENT DOCUMENTS

| | | |
|---|---|---|
| CN | 1301454 A | 6/2001 |
| CN | 1303568 A | 7/2001 |
| CN | 1310549 A | 8/2001 |
| CN | 1568603 | 1/2005 |
| EP | 0609936 | 8/1994 |
| EP | 0749221 | 12/1996 |
| EP | 1089560 | 4/2001 |
| EP | 0820193 | 4/2002 |
| EP | 1193976 | 4/2002 |
| JP | 63036625 A | 2/1988 |
| JP | 1994291780 | 10/1994 |
| JP | 8506938 | 7/1996 |
| JP | 08506941 | 7/1996 |
| JP | 08506942 | 7/1996 |
| JP | 8275077 A | 10/1996 |
| JP | 10276380 A | 10/1998 |
| JP | 11155138 | 6/1999 |
| JP | 1999175426 | 7/1999 |
| JP | 2000349725 A | 12/2000 |
| JP | 2001051926 A | 2/2001 |
| JP | 2001054089 A | 2/2001 |
| JP | 2001092880 A | 4/2001 |
| JP | 2001217860 A | 8/2001 |
| JP | 2001230996 A | 8/2001 |
| JP | 2001519626 A | 10/2001 |
| JP | 2002508637 T | 3/2002 |
| JP | 2002125161 A | 4/2002 |
| JP | 2002125168 A | 4/2002 |
| JP | 2002171228 A | 6/2002 |
| JP | 2002176589 A | 6/2002 |
| JP | 2002261711 A | 9/2002 |
| JP | 2003506974 A | 2/2003 |
| JP | 2003101812 A | 4/2003 |
| JP | 2003134490 A | 5/2003 |
| JP | 2003203035 A | 7/2003 |
| JP | 2003289520 A | 10/2003 |
| JP | 2004007063 A | 1/2004 |
| JP | 2004046833 | 2/2004 |
| JP | 2004056178 A | 2/2004 |
| JP | 2004128795 A | 4/2004 |
| JP | 2004152310 A | 5/2004 |
| JP | 2004186741 A | 7/2004 |
| JP | 2004524712 A | 8/2004 |
| JP | 2004287978 A | 10/2004 |
| JP | 2005039853 | 2/2005 |
| JP | 2005079989 A | 3/2005 |
| JP | 2005149129 A | 6/2005 |
| JP | 2005244869 A | 9/2005 |
| JP | 2006135388 | 5/2006 |
| KR | 19990021860 | 3/1999 |
| KR | 1020000059098 | 10/2000 |
| KR | 20010034740 | 4/2001 |
| KR | 20030001368 | 1/2003 |
| RU | 2073913 | 2/1997 |
| RU | 2220513 | 12/2003 |
| RU | 2239293 | 10/2004 |
| RU | 2254611 | 6/2005 |
| RU | 2321965 | 4/2008 |
| TW | I226797 | 1/2005 |
| TW | I233560 | 6/2005 |
| TW | 200523781 | 7/2005 |
| TW | I242190 | 10/2005 |
| WO | 9414281 A1 | 6/1994 |
| WO | 9414282 | 6/1994 |
| WO | WO9414279 | 6/1994 |
| WO | 9843426 | 10/1998 |
| WO | WO9843427 | 10/1998 |
| WO | 9918721 A1 | 4/1999 |
| WO | 9926415 A1 | 5/1999 |
| WO | WO9949663 A1 | 9/1999 |
| WO | WO9952285 A1 | 10/1999 |
| WO | 0021006 | 4/2000 |
| WO | 0028742 | 5/2000 |
| WO | 0033197 | 6/2000 |
| WO | 0117250 A1 | 3/2001 |
| WO | 0163900 | 8/2001 |
| WO | WO0217567 | 2/2002 |
| WO | 0239741 | 5/2002 |
| WO | 02065803 | 8/2002 |
| WO | 02087273 | 10/2002 |
| WO | WO02084524 A2 | 10/2002 |
| WO | 02099673 | 12/2002 |
| WO | WO03003704 A2 | 1/2003 |
| WO | WO04002187 | 12/2003 |
| WO | 2004021671 | 3/2004 |
| WO | 2004075087 A1 | 9/2004 |
| WO | 2004079589 | 9/2004 |
| WO | 2005022791 | 3/2005 |
| WO | 2005045603 | 5/2005 |
| WO | WO2005060257 A1 | 6/2005 |
| WO | 2005069624 | 7/2005 |
| WO | 2006015226 | 2/2006 |
| WO | 2006099239 | 9/2006 |

OTHER PUBLICATIONS

ESG Datamodel Comparison between OMA BCAST and DVB CBMS, Aug. 22, 2005, Open Mobile Alliance Ltd.

Landler, M., "The Dishes Are Coming: Satellites Go Suburban," New York Times, Late Edition—Final Ed., col. 5, p. 37, May 29, 1995.

Miller, A.L., "Cable Company Changes Channels Prestige Offers Cheaper Service," Baltimore Morning Sun, CAR edition, p. 8B, Oct. 21, 1992.

Steinberg, D., "Comcast to Roll out New Sports Package for Digital Cable," Philadelphia Inquirer, City edition, p. D02, Aug. 1, 2004.

Earnshaw, et al., "The TV-Anytime Content Reference Identifier," Network Working Group, RFC 4078, May 2005.

Peyret, et al., "Smart Cards Provide Very High Security and Flexibility in Subscribers Management," Aug. 1990, IEE Transactions and Consumer Electronics, vol. 36, No. 3, pp. 744-752.

Wong, et al., "Xstream: A Middleware for Streaming XML Contents over Wireless Environments," IEEE Transactions on Software Engineering, vol. 30, No. 12, Dec. 2004, pp. 918-935.

Wong, et al., "Efficient Management of XML Contents over Wireless Environment by Xstream," 2004 ACM Symposium on Applied Computing, pp. 1122-1127.

ISO-IEC 15706, Information and documentation—International standard Audiovisual Number (ISAN), 2002.

IPDC in DVB-H: Technical Requirements CBMS1026 v1.0.0 Rev. 1/TM 3095 Rev.2, 2004.

OMA: "Mobile Broadcast Services Requirements" Candidate Version 1.0, Feb. 3, 2005, pp. 1-69, pp. 14-21.

International Search Report—PCT/US06/035439, International Search Authority—European Patent Office, Feb. 9, 2007.

Written Opinion—PCT/US06/035439, International Search Authority—European Patent Office, Feb. 9, 2007.

International Preliminary Report on Patentability—PCT/US06/035439, The International Bureau of WIPO—Geneva, Switzerland, Mar. 27, 2008.

Tomoko Itao, Introduction of Dynamically Adaptive Networking Service Environment: DANSE, Multimedia, Distributed, Cooperative and Mobile (DICOMO), Symposium Collected Papers, 1997-2006, Ver. 1 .1. [DVD-ROM], Japan, Aggregate Corporation Information Processing Society, Jul. 2, 1997, pp. 125-130.

Wong, et al., Xstream: A Middleware for Streaming XML Contents over Wireless Environments, IEEE Transactions on Software Engineering, Dec. 1, 2004, vol. 30, No. 12.

Masuda Kazuo, "Visual Explorer of Kazuo Masuda", PC User, Softbank Publishing Corp., Mar. 2005, vol. 12, No. 3, pp. 78-81.

Hristova N., et al., "Ad-me: Wireless Advertising Adapted to the User Location, Device and Emotions", IEEE, Proceedings of the 37th Hawaii International—Conference on System Sciences (2004), pp. 1-10.

(56) References Cited

OTHER PUBLICATIONS

Rosenblatt, B., "500 channels and nothing's on", dated Dec. 4, 1998 and downloaded Nov. 14, 2013.
Time Magazine: "500 Channels and Nothing to Watch", dated Dec. 14, 1992 and downloaded Nov. 14, 2013.
Wikipedia: "57 Channels (And Nothin' On)", released in Jul. 1992, and downloaded Nov. 14, 2013.
Yates, B.L., "Cable History", Nov. 14, 2013 and dated, per copyright, in 2000.

* cited by examiner

APPARATUS AND METHODS FOR PROVIDING AND PRESENTING CUSTOMIZED CHANNEL INFORMATION

CLAIM OF PRIORITY UNDER 35 U.S.C. §119

The present Application for patent claims priority to Provisional Application No. 60/716,408, entitled "CUSTOMIZATION OF COMMON CHANNEL INFORMATION PER CONTENT RETAILER IN A PROGRAM GUIDE, AND FOR THE CONTENT PROVIDED FOR THE CHANNEL," filed Sep. 12, 2005, and assigned to the assignee hereof and hereby expressly incorporated by reference herein.

REFERENCE TO CO-PENDING APPLICATIONS FOR PATENT

U.S. patent application Ser. No. 11/270,199 entitled "METHODS AND APPARATUS FOR DISTRIBUTING CONTENT TO SUPPORT MULTIPLE CUSTOMER SERVICE ENTITIES AND CONTENT PACKAGERS", filed concurrently herewith, assigned to the assignee hereof, and expressly incorporated by reference herein, U.S. Pat. No. 8,528,029 entitled "APPARATUS AND METHODS OF OPEN AND CLOSED PACKAGE SUBSCRIPTION", filed concurrently herewith, assigned to the assignee hereof, and expressly incorporated by reference herein, U.S. Pat. No. 7,565,506 entitled "METHOD AND APPARATUS FOR DELIVERING CONTENT BASED ON RECEIVERS CHARACTERISTICS", filed concurrently herewith, assigned to the assignee hereof, and expressly incorporated by reference herein, U.S. patent application Ser. No. 11/270,370 entitled "APPARATUS AND METHODS FOR DELIVERING AND PRESENTING AUXILIARY SERVICES FOR CUSTOMIZING A CHANNEL", filed concurrently herewith, assigned to the assignee hereof, and expressly incorporated by reference herein, U.S. Pat. No. 8,571,570 entitled "METHODS AND APPARATUS FOR DELIVERING REGIONAL PARAMETERS", filed concurrently herewith, assigned to the assignee hereof, and expressly incorporated by reference herein, U.S. Pat. No. 8,533,358 entitled "METHODS AND APPARATUS FOR FRAGMENTING SYSTEM INFORMATION MESSAGES IN WIRELESS NETWORKS", filed concurrently herewith, assigned to the assignee hereof, and expressly incorporated by reference herein, U.S. patent application Ser. No. 11/270,165 entitled "FLEXIBLE SYSTEM FOR DISTRIBUTING CONTENT TO A DEVICE", filed concurrently herewith, assigned to the assignee hereof, and expressly incorporated by reference herein, U.S. Pat. No. 8,600,836 entitled "SYSTEM FOR DISTRIBUTING PACKAGES AND CHANNELS TO A DEVICE", filed concurrently herewith, assigned to the assignee hereof, and expressly incorporated by reference herein; and U.S. Provisional Application No. 60/735,044 entitled "METHODS AND APPARATUS FOR PROVIDING SYSTEM INFORMATION TO A WIRELESS DEVICE", filed concurrently herewith, assigned to the assignee hereof, and expressly incorporated by reference herein.

BACKGROUND

The disclosed embodiments relate generally to the operation of content distribution systems, and more particularly, to methods and apparatus for providing and presenting a customized view of a channel in a media distribution system.

In media distribution systems, a media program guide (MPG), which describes a delivery schedule of available content or services on a given set of channels, may be provided by content retailers (CRs) in a distribution network. For example, a content provider (CP) that operates on the distribution network may provide the content or services to one or more CRs in communication with the network. The CRs provide the MPG, which includes information relating to the content or services, to device users who then may select content or services to be received by a device. For example, a device user may select and/or subscribe to receive content or services that include multimedia content, clips, programs, scripts, data, customer services, or any other type of content or service.

Currently, channels that represent the content or services are delivered to multiple content distributors and consumers with identical content and descriptions. In order to provide for retailer-specific marketing and branding opportunities, and in order to provide product differentiation, it is desirable to be able to customize the presentation of the channel and associated supplemental data based on the specific content retailer.

SUMMARY

The described embodiments provide systems, apparatus, devices, computer-readable media, processors and methods for providing and generating customized content information.

In one embodiment, a method for providing content information comprises receiving a definition of service attribute information corresponding to a base service for each of a plurality of base services, wherein each base service is operable to provide at least a portion of a presentation to a device, and receiving a customized definition to apply to at least one of the plurality of service attribute information. The method further comprises providing a plurality of channel information to the device, at least one of the plurality of channel information comprising the customized definition. In a related embodiment, at least one processor is configured to perform the above-described actions. In another related embodiment, a computer program resident in a computer readable medium that, when executed, directs a computer device to perform the actions noted above.

In another embodiment, an apparatus for providing content information comprises a means for receiving a definition of service attribute information corresponding to a base service for each of a plurality of base services, wherein each base service is operable to provide at least a portion of a presentation to a device. The apparatus further comprises a means for receiving a customized definition of at least one of the plurality of service attribute information. Additionally, the apparatus comprises a means for providing a plurality of channel information to the device, at least one of the plurality of channel information comprising the customized definition.

In yet another embodiment, an apparatus for providing content information comprises a content server having a first definition of service attribute information and a second definition of custom attribute information, wherein the service attribute information corresponds to a base service operable to provide at least a portion of a presentation to a device. Additionally, the apparatus comprises a generator module operable to generate and transmit a system information message having at least one customized channel definition for transmission to the device, wherein the customized channel definition comprises a predetermined combination of at least a portion of the first definition of the service attribute information and a corresponding portion of the second definition of the custom attribute information.

In still another embodiment, a method for presenting content information comprises receiving a definition of service attribute information corresponding to a base service, wherein the base service is operable to provide at least a portion of a presentation to a device. The method further comprises receiving a definition of custom attribute information. Additionally, the method comprises generating a view of custom channel information based on a predetermined combination of the defined custom attribute information with the defined service attribute information. In a related embodiment, at least one processor is configured to perform the above-described actions. In another related embodiment, a computer program resident in a computer readable medium that, when executed, directs a computer device to perform the actions noted above.

In a further embodiment, a wireless device comprises a means for receiving a definition of service attribute information corresponding to a base service, wherein the base service is operable to provide at least a portion of a presentation to a device. The wireless device further comprises a means for receiving a definition of custom attribute information. Additionally, the wireless device comprises a means for generating a view of custom channel information based on a predetermined combination of the defined custom attribute information with the defined service attribute information.

In another embodiment, a wireless device comprises a computer platform having a data repository comprising a first definition and a second definition. The first definition defining service attribute information corresponding to a base service operable to provide at least a portion of a presentation, and the second definition defining custom attribute information. Additionally, the wireless device comprises a media manager module on the computer platform and operable to initiate generation of a view of custom channel information based on a predetermined combination of the defined custom attribute information with the defined service attribute information.

DETAILED DESCRIPTION

The following detailed description describes one or more embodiments of a content delivery system. The system is especially well suited for use in wireless network environments, but may be used in any type of network environment, including but not limited to, communication networks, public networks, such as the Internet, private networks, such as virtual private networks (VPN), local area networks, wide area networks, long haul networks, or any other type of data or communication network.

Figure 1:
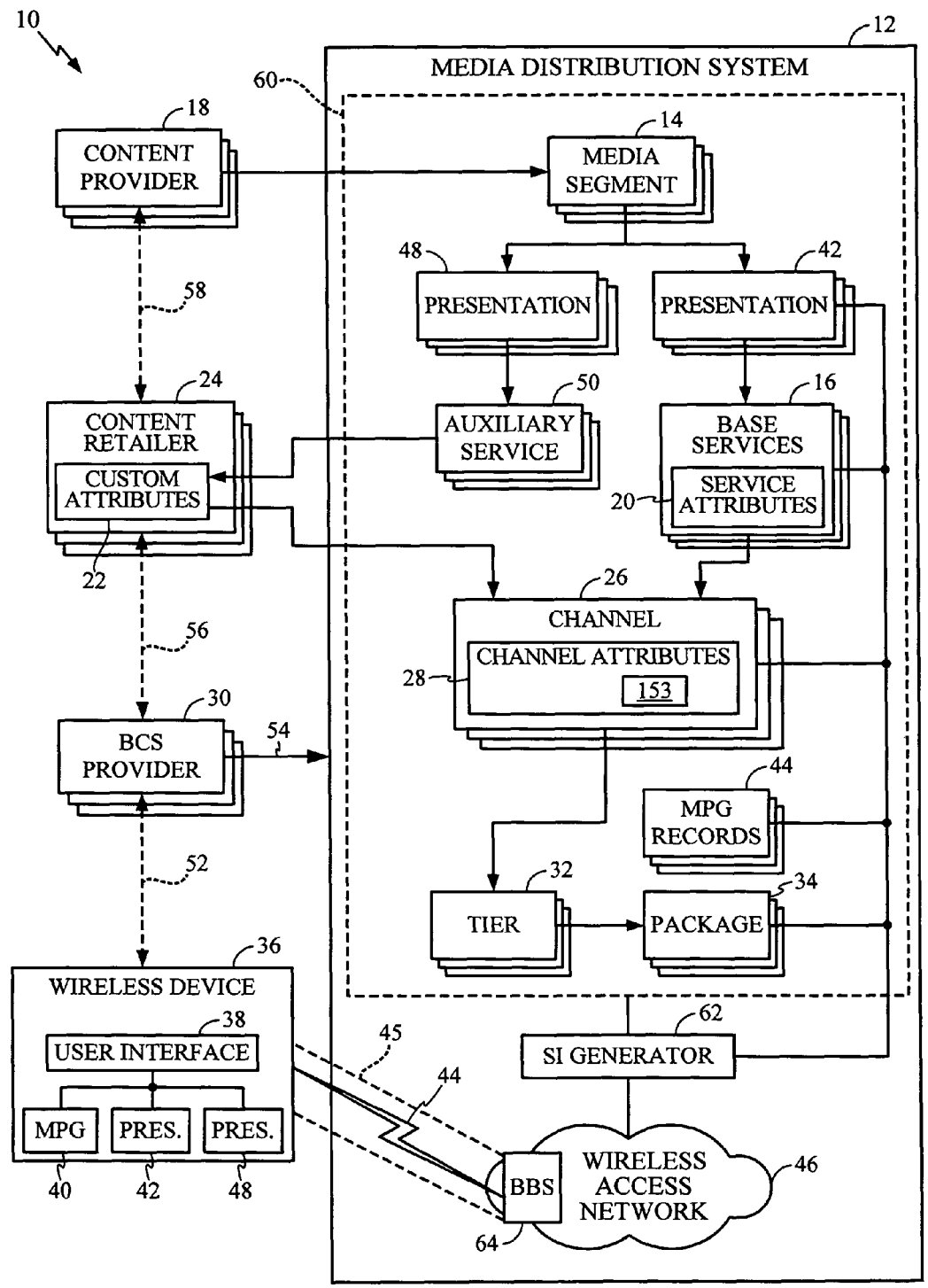
FIG. 1 is a schematic diagram of one embodiment of a system for delivering customized content and channel information.

Referring to FIG. 1, one embodiment of a system 10 for providing customized content and channel information includes a media distribution system ("MDS") 12 that operates to receive media segments 14, which form a plurality of base services 16 or common channels, from a plurality of content providers 18. Further, for each of the plurality of base services 16, MDS 12 includes service attribute information 20 or common channel information, which defines and describes the corresponding base service. Additionally, MDS 12 receives custom attribute information 22 from each of a plurality of content retailers 24. Custom attribute information 22 includes content retailer-specific definitions and descriptions for each of the plurality of base services 16, which in one embodiment supplement or replace the corresponding service attribute information 20. MDS 12 is operable to generate a customized view of each base service 16 for each content retailer 24 by replacing service attribute information 20 with custom attribute information 22. These customized views of each base service 16 are defined as channels, customized channels or purchase items 26, which are content retailer-specific due to the customizations and which are available to users for subscription/purchase. The combination of service attribute information 20 and custom attribute information 22 thereby define customized channel attribute information 28 for each of the plurality of channels 26. Each content retailer 24 or billing and customer service provider (BCS) 30 may then group various combinations of channels 26 into tiers 32, and various combinations of tiers 32 into packages 34 to offer, such as on a subscription basis, to devices associated with the given content retailer 24 and/or BCS 30, such as wireless device 36.

In one embodiment, for example, each content retailer 24 and/or BCS 30 can provide a customized display of channels 26 on a user interface 38 of a subscribed wireless device 36 in the form of a media presentation guide ("MPG") 40. MPG 40 comprises a schedule of presentations 42 on each of the plurality of channels 26, where each presentation 42 comprises a form of media that includes one or more media segments 14. As will be discussed below in more detail, MPG 40 is constructed based on media presentation guide title records 80 (FIGS. 3 and 6) and channel customization records 84 (FIGS. 3 and 13) associated with each presentation 42, 48, base service 16, auxiliary service 50, and/or channel 26. For example, MPG title records 80 and channel customization records 84 may be part of a system information (SI) message 44 sent within a flow 45 from MDS 12 to wireless device 36 via a wireless access network 46. Flow 45 is a logical stream within a "multiplex," which is a set of flows for a given area. Each flow 45 is typically used to deliver a single media component of a real-time presentation, or a file containing a non real-time presentation, or SI messages 44. Thus, each MPG 40 is customized on each device according to the associated content retailer 24 and/or BCS 30.

In another embodiment, the customized view includes presentation 42 from base service 16 in combination with an auxiliary presentation 48 from an auxiliary service 50 displayed on user interface 38. Auxiliary presentation 48 and auxiliary service 50, which are provided to customize and enhance a base service, will be discussed in more detail below.

In one embodiment, service attribute information 20 and custom attribute information 22 comprise essentially the fields or records, but with different values. Custom attribute information 22, for example, may be retailer-specific information utilized to give the presentation of the service by the given retailer a unique look and feel. For example, the fields or records associated with either information 20 and/or 22 may include at least one of: a name and a description associated with a given language; an additional description providing more details than the previously-mentioned description; an associated universal resource identifier (URI) or universal resource locator (URL) that references a source of more information relating to the service; a type of device recommended to receive the service; an icon associated with the type of device; an icon to identify or represent the service; a start time; a duration; a genre; a parental rating; an intro; an outro; an advertisement; a barker; an Internet Protocol datacast; and any other attribute or descriptor associated with a service. In particular, the combination of a given base service 16 with one or more retailer-defined auxiliary presentations 48 and/or auxiliary services 50 provides a unique view of a channel-related information for each retailer.

Thus, system 10 comprises one embodiment of a transport system that operates to create and transport multimedia content flows across data networks. For example, the transport system is suitable for use in transporting media from a content provider to a media distribution system for broadcast distribution. Advantageously, system 10 enables content retailers 24 and/or BCS providers 30 to customize base services 16 to provide customized channels 26, customized media presentation guides 40, and customized presentations 42 and 48 to subscribed devices.

Any number of devices may be operable with system 10 to receive and play/display content and content information. Wireless device 36 is one such device, and includes devices such as a cellular telephone, a personal digital assistant, a laptop computer, and any other wireless device operable to receive and play/display media. It should be noted, however, that in one or more embodiments of system 10, virtually any number or type of wired or wireless device capable of playing/displaying media may be utilized.

In FIG. 1, the components of system 10 may each have a number of defined roles that allow certain functions to be separated from other functions. It should be noted, however, that in any given implementation of system 10, any given component or organization may perform multiple roles.

In one embodiment, for example, BCS provider 30 comprises a business entity that provides the user billing and customer support services on behalf of one or more content retailers 24. Each device in system 10, such as wireless device 36, is associated with one BCS provider 30, such as through a subscription agreement 52. As such, BCS provider 30 may supply subscription data 54 to MDS 12.

Content retailer 24 comprises a business entity that defines packages 34 and offers them for subscription through one or more associated BCS providers 30. Accordingly, each content retailer 24 provides packages 34 and the associated packaged data to MDS 12. Further, for example, each content retailer 24 may be associated with one or more BCS providers 30 through a content retail agreement 56.

Although content retailer 24 and BCS provider 30 are represented as separate entities, it is contemplated that they may be combined into a single entity.

Content provider 18 may comprise a business entity that supplies content delivered to the user, such as device 36, through base services 16. For example, each content provider 18 supplies media segments 14 and the associated media data to MDS 12. Each media segment 14 may comprise one or more of video, audio, multimedia content, clips, real-time and non real-time content, a combined and/or simultaneous real-time and non-real time content, scripts, programs, or any other type of suitable content. Further, for example, each content provider 18 may be associated with one or more content retailers 24 through a content retail agreement 58.

MDS 12 comprises any combination of wired and wireless networks, and associated computer devices and servers, which operates to distribute content for delivery to users. MDS 12 may comprise an optimized broadcast network designed and optimized to deliver high-quality content to selected devices over plurality of optimized communication channels. Further, for example, MDS 12 may comprise one or more content servers 60 that store the previously mentioned media, data and records, along with the logic and executable instructions to enable the functionality of MDS 12. In one embodiment, for example, content server 60 and/or MDS 12 includes a system information (SI) message generator 62 having hardware and/or software, including memory, executable instructions and a processor, operable to generate SI message 44 based on the data within content server 60. For example, SI message generator 62 includes generator logic for compiling SI message 44 from the data within MDS 12, and transceiver logic for receiving all SI message-related data and sending SI message 44 out of MDS 12 for distribution to devices. Additionally, for example, MDS 12 may include wireless access network 46 having a broadcast base station (BBS) 64 that provides a transport interface to allow MDS 12 to deliver SI message 44 and content in the form of content flows to wireless access network 46 for broadcast/multicast to devices, such as wireless device 36.

Figure 2:
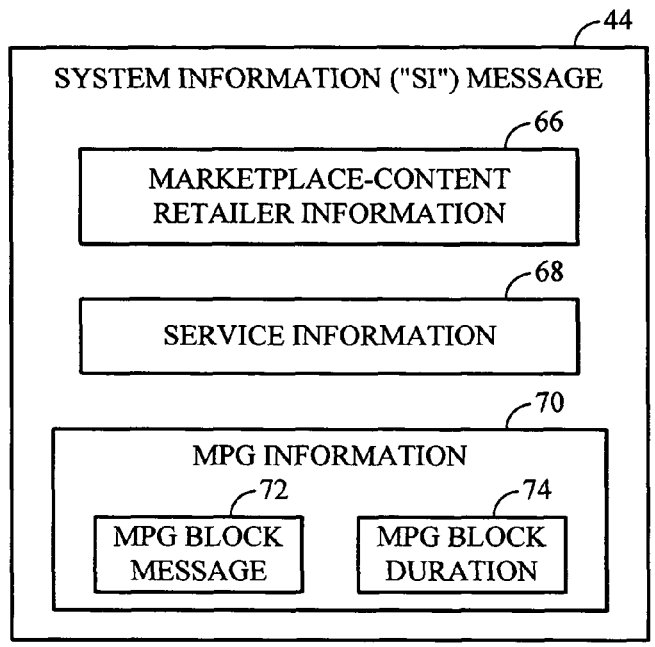
FIG. 2 is a schematic diagram of one embodiment of a system information message transported by the system of FIG. 1.
Figure 4:
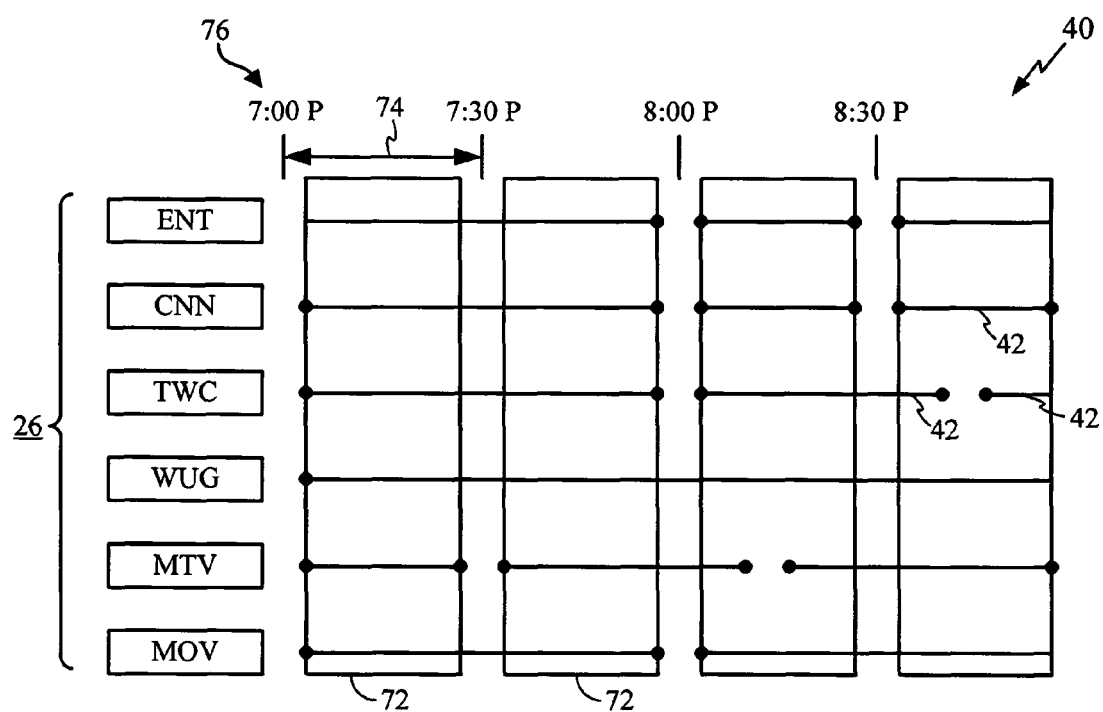
FIG. 4 is a schematic diagram of one embodiment of various components of a media program guide (MPG), including the MPG block of FIG. 3.

Referring to FIG. 2, SI message 44 comprises a set of information that enables a device to locate services or subscribe to packages on behalf of the user, and to describe marketplace information 66, service information 68 and MPG information 70 to the user. Marketplace information 66 includes information describing each BCS provider 30, content retailer 24, package 34, tier 32, and channel 26. Service information 68 includes information about each base service 16 and auxiliary service 50 available in system 10. MPG information 70 includes information about the contents of channels 26.

In one embodiment, referring to FIGS. 2-5, MPG information 70 includes an MPG block message 72 that defines the available content in a fixed period of time, referred to as an MPG block duration 74. MPG Block duration 74 is a configurable parameter, which may be signaled in a transport flow, and which defines a size of the window of time covered by MPG Block message 72. Information about content which spans the boundary between two consecutive MPG blocks 72 is present in each MPG block 72. Each MPG block message 72 defines: a start time 76, which is the earliest time covered by the MPG block and corresponds to the end of the interval covered by the previous MPG block, and a version 78 of the MPG block, which the identifies a particular set of attributes and element values which allows for the identification of an MPG Block; MPG title records 80 for all MPG titles, i.e. presentations and their associated media presentation guide information, shown during the MPG block duration, where each MPG title record 80 completely describes all applicable attributes of an MPG title; contact window information 82 for all non real-time presentations downloaded during the MPG block duration; channel customization records 84 defining customized adaptations for each MPG title for respective ones of the various channels 26 through which the services 16 may be accessed; and, blackout information 86 defining the region or regions in which the MPG title is to be blacked out. Each of these components of the MPG block message 72 will be described in more detail below.

Each MPG 40 is constructed from a predetermined number of MPG Blocks 72, which are relatively ordered based on their respective start times 76. Further, the order of channels 26 listed within each MPG 40 is dictated based upon a channel weight 153 associated with each channel 26, where the channel weight comprises one of the custom channel attributes 28. MPG 40 displays a name 88 and/or icon 90 for each channel 26, and a name 92 and/or icon 94 for each presentation 42 and/or 48. For example, names 88, 92 and/or icons 90, 94 may be associated with base service 16 or may be customized based on custom attributes 22 associated with each content retailer 24. Additionally, icons 90, 94 respectively associated with each channel 26 and presentation 42 and/or 48 may indicate a presentation type, such as real time, non real-time, data, or some combination thereof. Further, MPG 40 displays start times 76 associated with presentations 42 and/or 48, and may further include a current date 96 as well as one or more functional keys 98. For example, functional keys 98 may include a "Watch" key to initiate watching a highlighted presentation, and an "Options" key to allow a user to access additional information, such as information about the respective service, channel, presentation, or a subscription to a service, presentation, channel or package.

Figure 3:
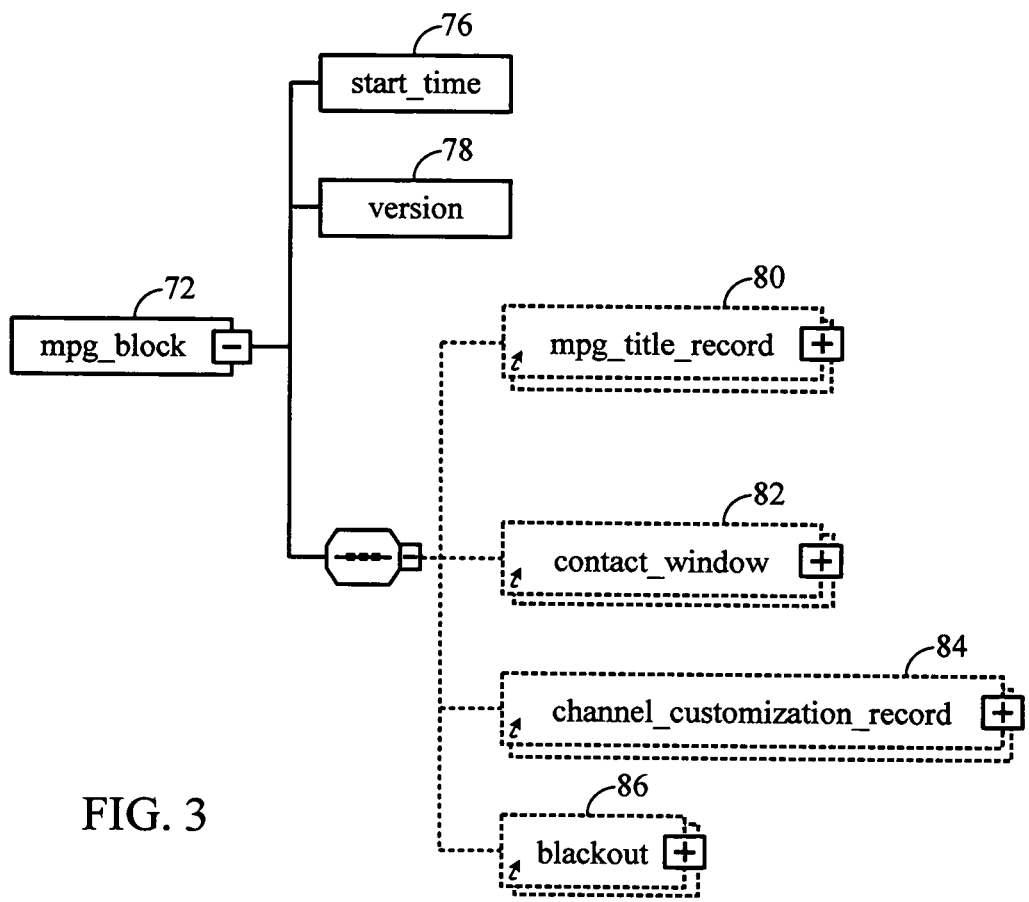
FIG. 3 is a schematic diagram of one embodiment of a media presentation guide (MPG) block record that may comprise a portion of the system information message of FIG. 2.
Figure 5:
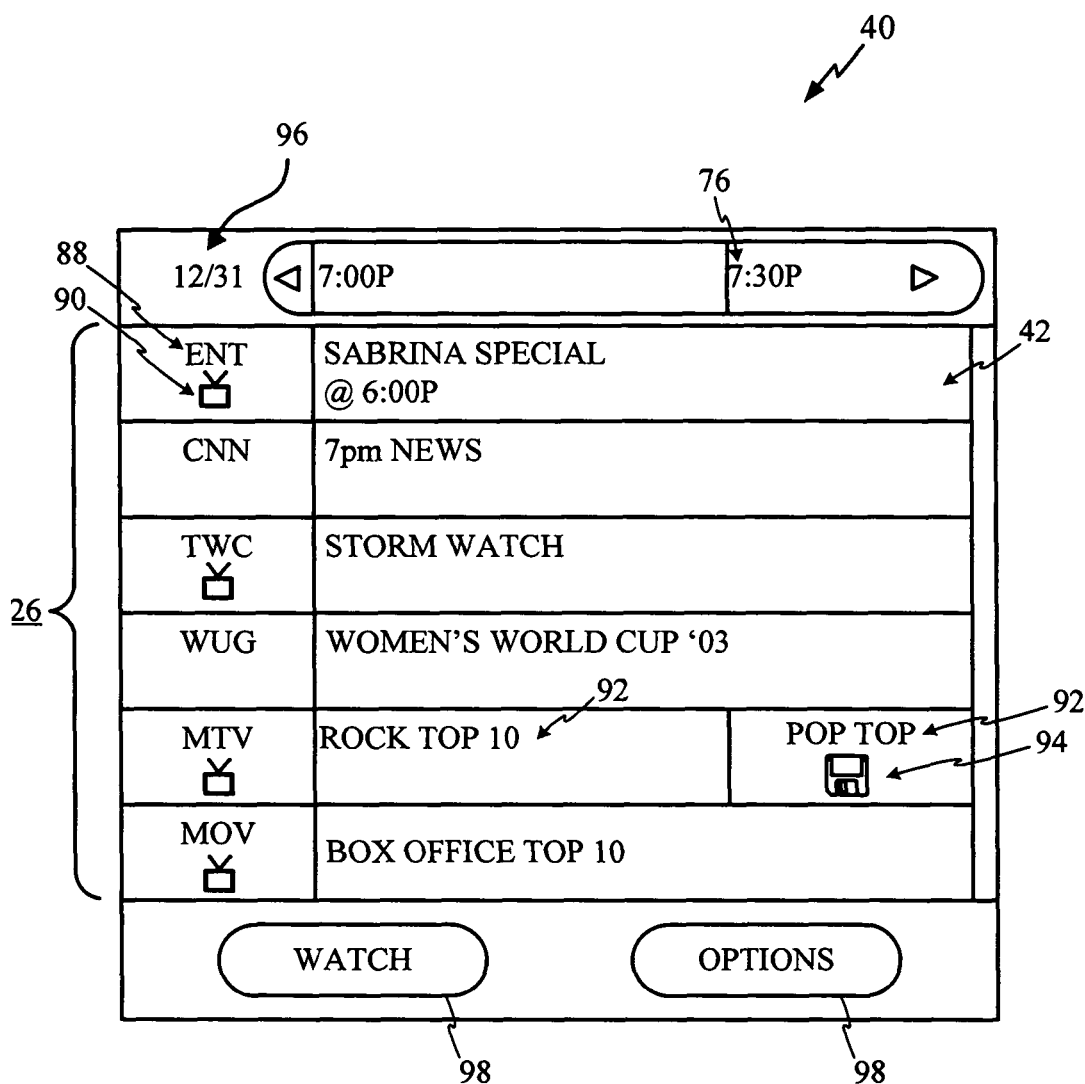
FIG. 5 is a screen shot of one embodiment of a MPG constructed from the components of FIG. 4.
Figure 6:
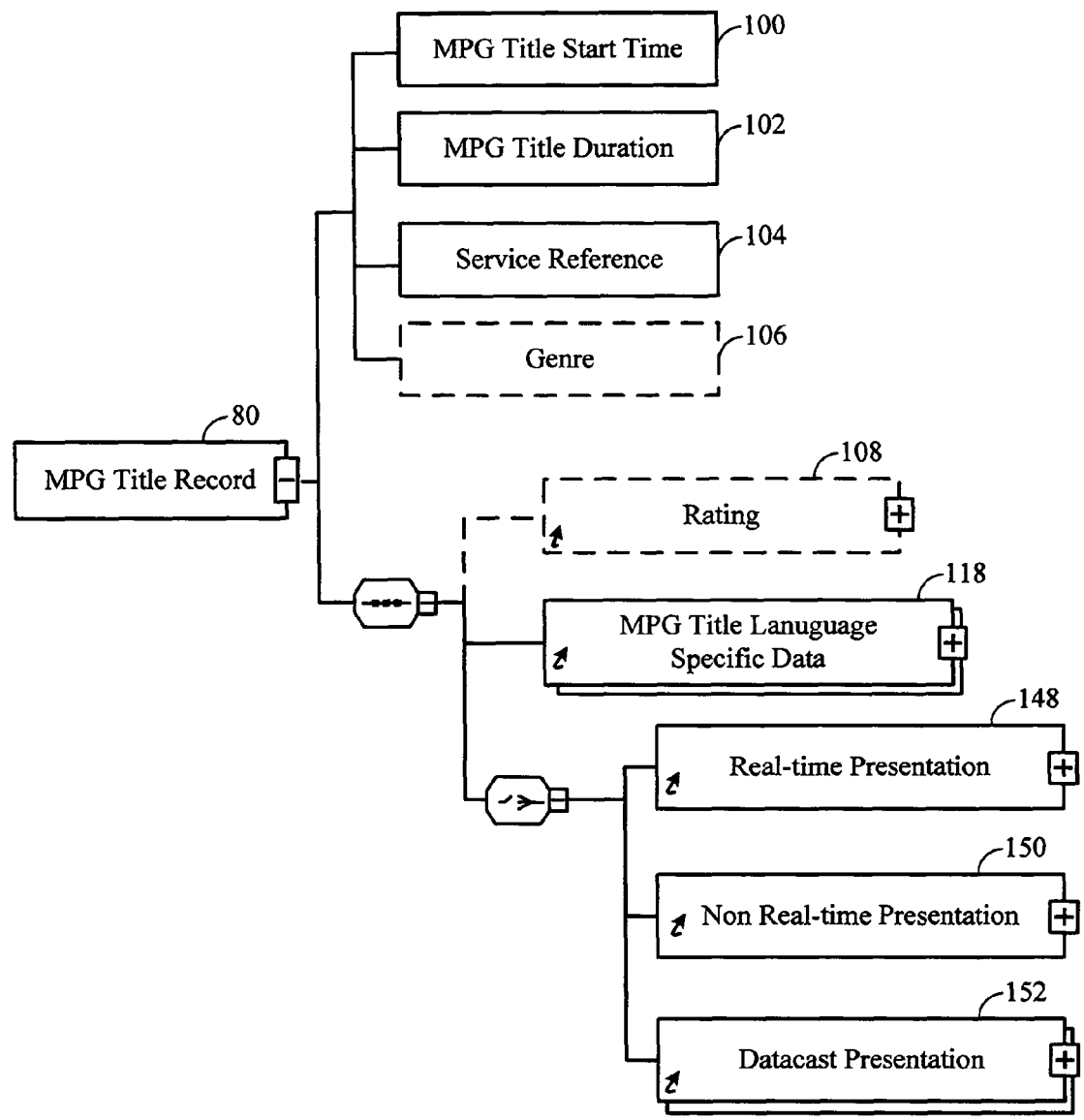
FIG. 6 is a schematic diagram of one embodiment of an MPG title record associated with the MPG block of FIG. 3.

Referring to FIGS. 3 and 6, in one embodiment MPG title record 80 includes an MPG title start time 100 and an MPG title duration 102. MPG title start time 100 is the time at which presentation of the content covered by the MPG title can begin. If the service is a real-time service or an IP datacast service, then MPG title start time 100 is the time at which the live display of the content shall commence, exclusive of any "intros," or introductory presentations or media segments, associated with the MPG title. If the service is a non real-time service, MPG title start time 100 is the earliest time at which display of the content may commence, which could be as early as when the non real-time service is stored to device memory, exclusive of any "intros" associated with the MPG title. If the service is a combined real-time and non real-time service, known as a "per MPG title" service, then the significance of MPG title start time 100 is dependent on the nature of the content associated with the MPG title, as defined in the preceding two sentences.

Similarly, MPG title duration 102 depends on the type of service. If the service is a real-time service or an IP datacast service, then MPG title duration 102 added to MPG title start time 100 is the time at which display of the content shall end, inclusive of any "outros," which is an additional presentation that follows the main presentation, associated with the MPG title. If the service is a non real-time service, then MPG title duration 102 added to MPG title start time 100 is the latest time at which display of the content may commence, exclusive of any "intros" associated with the MPG title. If the service is a "per MPG title service," then the significance of MPG title duration 102 is dependent on the nature of the content associated with the MPG title, as defined in the proceeding to sentences. As such, MPG title duration 102 relates to actual viewing time for real time content and the available to commence viewing time for non real-time content, and comprises the window of time across which the MPG title name is displayed on MPG 40.

In this embodiment, MPG title record 80 may further include a service reference 104 and a genre 106. Service reference 104 includes a service identification, which identifies the base service 16 associated with the MPG title. Genre 106 is an attribute that describes the semantic class of content provided by the MPG title, such as comedy, documentary, drama, mystery, etc.

Figure 7:
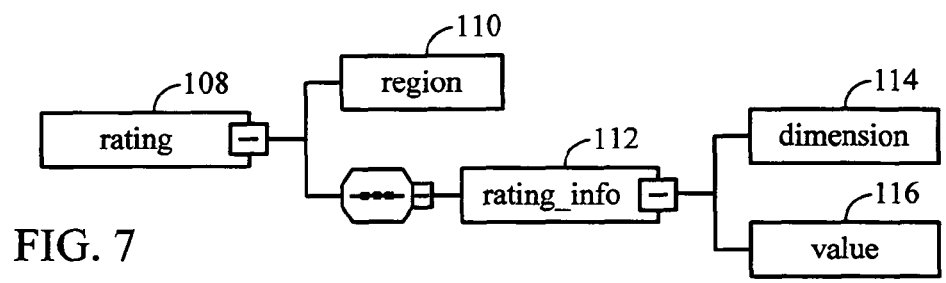
FIG. 7 is a schematic diagram of one embodiment of a rating record associated with the MPG title record of FIG. 6.

Referring to FIGS. 6 and 7, MPG title record 80 may further include one or more ratings 108 for the MPG title. Rating 108 defines a parental advisory rating value for the MPG title, which may be provided along with the content by content provider 18. In one embodiment, for example, rating 108 may include a rating region 110 and corresponding additional rating information 112, such as a rating dimension 114 and a rating value 116. Rating region 110 specifies the geographical region in which rating 108 applies. There may be a separate rating 108 for each rating region 110 in which the associated base service 16 is offered. Rating dimension 114 identifies an aspect of the rating system that applies to the associated rating it region 110. For example, in the United States Region rating scheme, rating dimension 114 may be a description such as "violence," "language," etc. In other regions, rating dimension 114 may represent different descriptions. Rating value 116 specifies a value associated with the corresponding rating dimension 114, and thereby helps to quantify and compare relative ratings.

Figure 8:
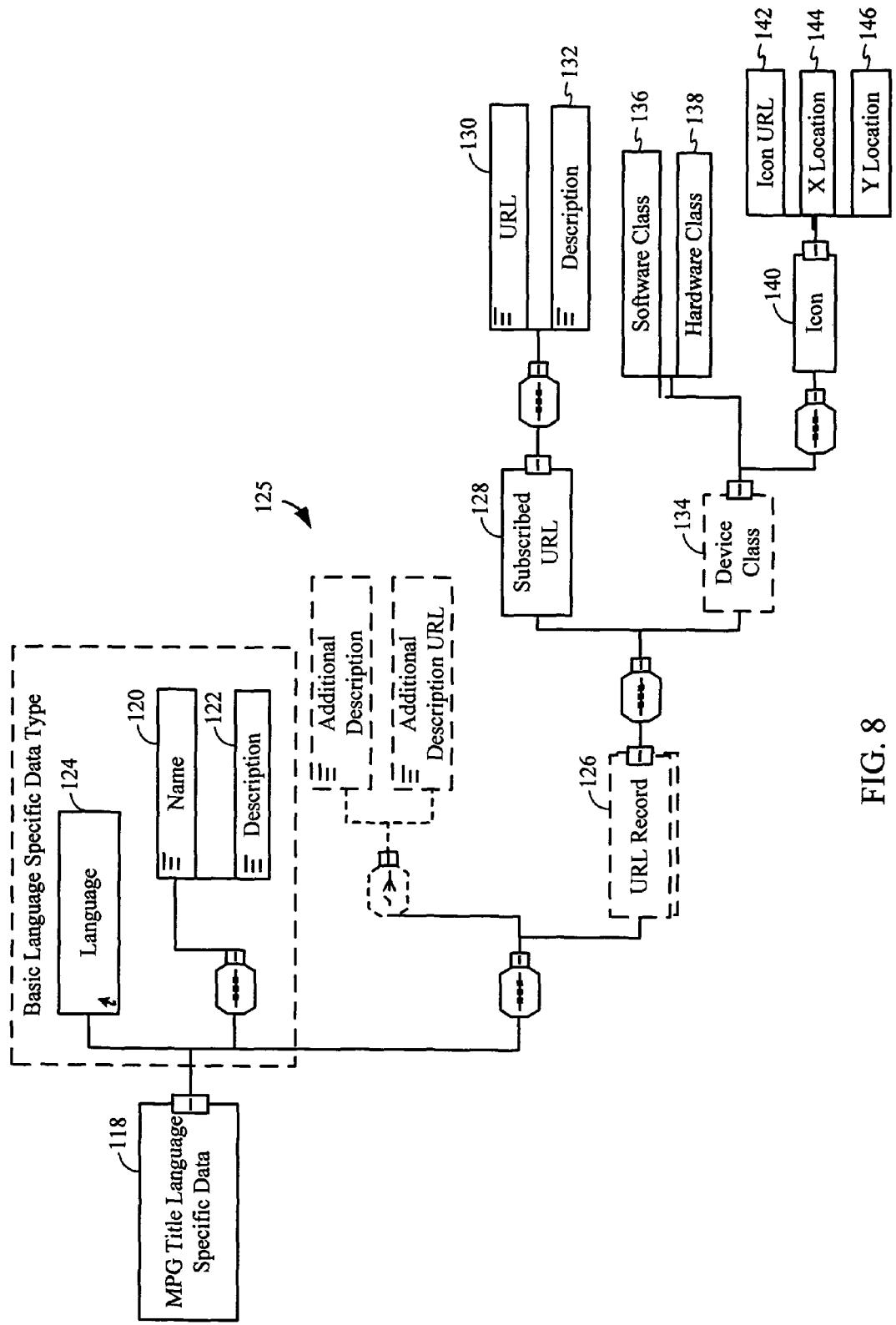
FIG. 8 is a schematic diagram of one embodiment of an MPG title language specific data record associated with the MPG title record of FIG. 6.

Referring to FIGS. 6 and 8, MPG title record 80 may further include one or more MPG title language specific data records 118. Each MPG title language specific data record 118 specifies a title name 120 and a title description 122 of the MPG title associated with a specific language 124. Title name 120 is an attribute that specifies a name for the MPG title that may be displayed to the user. Similarly, title description 122 is an attribute that specifies a description for the MPG title that may be displayed to the user. Further, each MPG title language specific data record 118 may provide additional description 125 and define one or more universal resource locator (URL) records 126 where a subscribed user can obtain further information about the MPG title. Additional description 125 is an attribute that specifies an additional description relating to the MPG title that may be displayed to the user, including more details about the title and additional URLs where further information may be found.

There may be one more MPG title URL records 126 per language 124 and each URL record 126 may specify a subscribed URL 128, which may include a URL link 130 and a URL description 132 associated with the URL link. Further each URL record 126 may include one or more device class records 134 that indicate the particular type of device required to access the associated URL. Each device class record 134 may include a software class record 136 that specifies the type of operating system environment appropriate for the URL, such as the Palm OS® operating system for handheld computers. Similarly, each device class record 134 may include a hardware class record 138 that specifies the type of device appropriate for the URLs, such as a personal digital assistant (PDA) device. Further, each device class record 134 may include a device class icon 140, which may include a graphic file or an icon URL reference 142 that provides access to a graphic file that may be used as an icon. Icon URL reference 142 identifies a resource which provides an icon image for the corresponding channel 26 which is appropriate for the given device class 134. The URL may point to an external reference, such as an HTML link, or to an internal file. Further, device class icon 140 may include an x-location reference 144 and a y-location reference 146, which are unsigned integers respectively specifying the horizontal and vertical location of the icon on the device class 134.

Referring back to FIG. 6, MPG title record 80 may further include a description of the presentation associated with the MPG title, such as a real-time presentation 148, a non real-time presentation 150, and one or more datacast presentations 152

Figure 9:
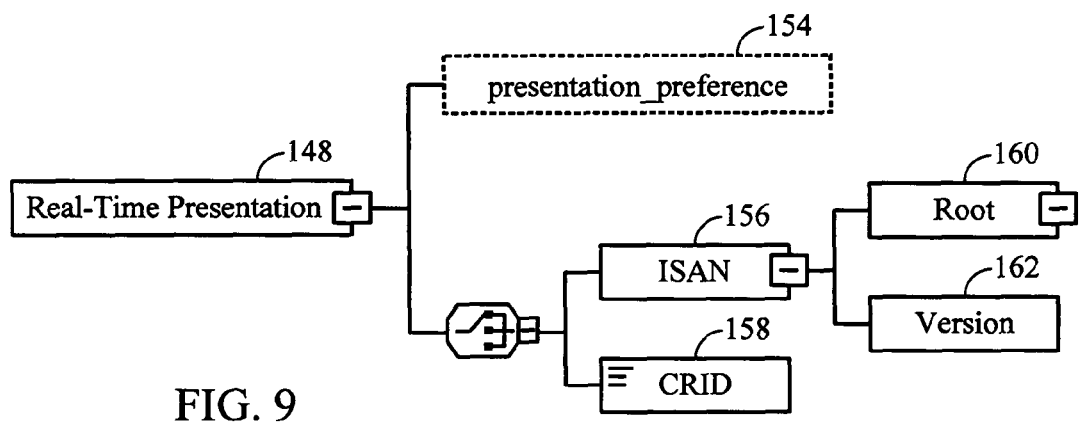
FIG. 9 is a schematic diagram of one embodiment of a real-time presentation record associated with the MPG title record of FIG. 6.

Referring to FIG. 9, real-time presentation 148 may define a presentation reference 154 and optional presentation identification information for media tracking, such as one or more of an International Standard Audiovisual Number (ISAN) reference 156 and a Content Reference IDentifier (CRID) reference 158. Presentation reference 154 defines a presentation identifier that uniquely distinguishes the presentation from all other presentations on system 10. ISAN reference 156 is the International Standard Audiovisual Number (ISAN), which may include a root 160 and/or a version 162, as specified in the joint International Organization for Standardization-International Electrotechnical Commission (ISO-IEC) standard number 15706, Information and documentation—International Standard Audiovisual Number (ISAN), 2002, hereby incorporated by reference. Similarly, CRID reference 158 is the Content Reference IDentifier (CRID) as specified in Request For Comment (RFC) number 4078, Earnshow, Nigel; Aoki, Shigeru; Ashley, Alex; Kameyama, Wateru, The TV-Anytime Content Reference Identifier, 2005, hereby incorporated by reference.

Figure 10:
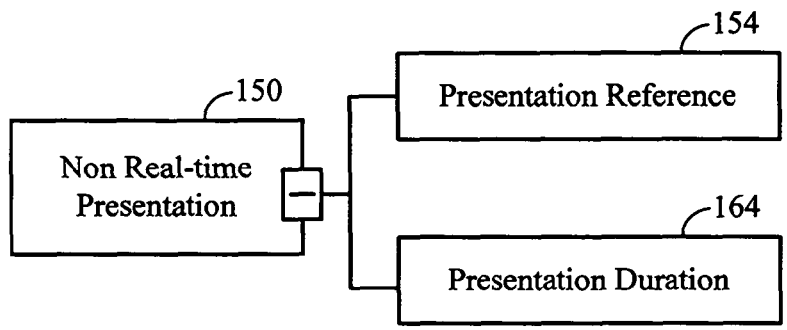
FIG. 10 is a schematic diagram of one embodiment of a non real-time presentation record associated with the MPG title record of FIG. 6.

Referring to FIG. 10, non real-time presentation 150 may include a presentation reference 154, which identifies the given presentation, and presentation duration 164, which specifies the amount of time needed to view the non real-time presentation. Non real-time presentations are files which have been downloaded to the device, such as wireless device 36, before presentation to the user. The times at which the files are downloaded are advertised in advance through MPG 40 in one or more contact windows. Each contact window represents a timeframe within which, at any time, the device can initiate acquisition of the file.

In one embodiment, for example, content retailer 24 and/or BCS provider 30 may limit viewing of the presentation to a specified presentation window, which is specified in MPG 40 as a start time, i.e. MPG title start time 100, and a duration, i.e. MPG title duration 102, exactly as for a real-time presentation. However, in this case, the start and end times indicate the earliest and latest times that the user may begin to view the presentation. Unlike a real-time presentation, viewing can commence at any time within the presentation window. If the duration of the presentation is shorter than the presentation window, then the user may elect to view the presentation multiple times within the presentation window.

As a result of these characteristics, activity related to the distribution and viewing of the presentation may continue after the respective ends of the contact windows and the presentation windows. A device that initiates acquisition at the end of the contact window can still complete acquisition of the file. In order to allow the device to determine when an acquisition attempt has failed in this case, the definition of the contact window in MPG 40 also includes the contact duration attribute. For this reason, the end of the contact window may be separated from the start time of the presentation by at least the length of the contact duration.

Similarly, if a user elects to view a presentation at the end of the presentation window, the presentation can be viewed to its end, as determined by the duration of the presentation.

Figure 11:
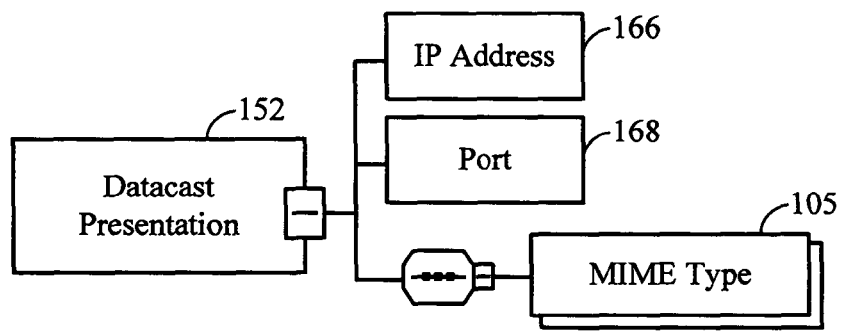
FIG. 11 is a schematic diagram of one embodiment of a datacast presentation record associated with the MPG title record of FIG. 6.

Referring to FIG. 11, datacast presentation 152 defines an Internet Protocol (IP) address 166, an IP port 168, and one or more Multipurpose Internet Mail Extensions (MIME) types 170 for the IP datacast presentation. For example, IP address 166 may be an IPv4 or an IPv6 multicast address, and IP port 168 may be an IPv4 or an IPv6 port. MIME type 170 defines the type of media offered over the IP multicast address in the presentation.

Figure 12:
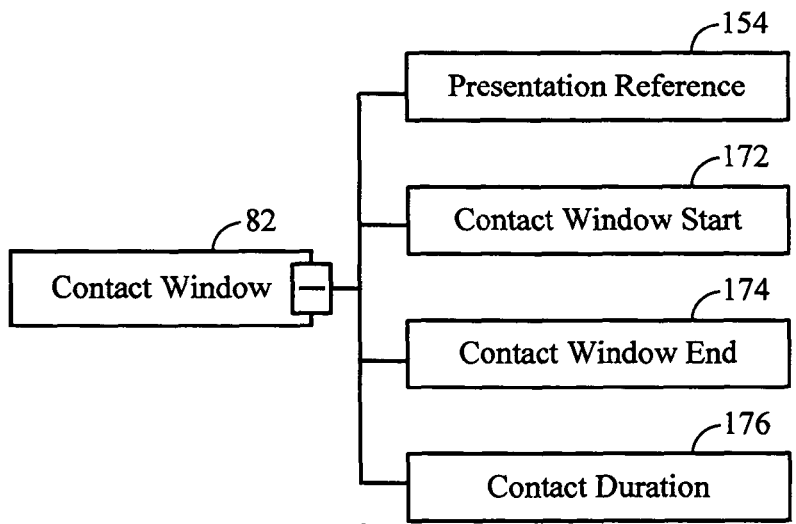
FIG. 12 is a schematic diagram of one embodiment of a contact window record associated with the MPG block record of FIG. 3.

Referring to FIG. 12, contact window 82 represents an interval of time during which a non real-time presentation, or an auxiliary presentation with non real-time content, is being transmitted. Each such presentation may be preceded by at least one contact window 82 for the presentation. In one embodiment, for example, contact window 82 includes presentation reference 154 that identifies the presentation associated with a contact window start time 172, a contact window end time 174 and a contact duration 176. Contact window start time 172 is a time at which transmission of the presentation commences. Contact window end time 174 is the latest time which a device can begin to acquire the presentation. Contact window duration 176 may be used by the device to determine whether a download is successful.

Figure 13:
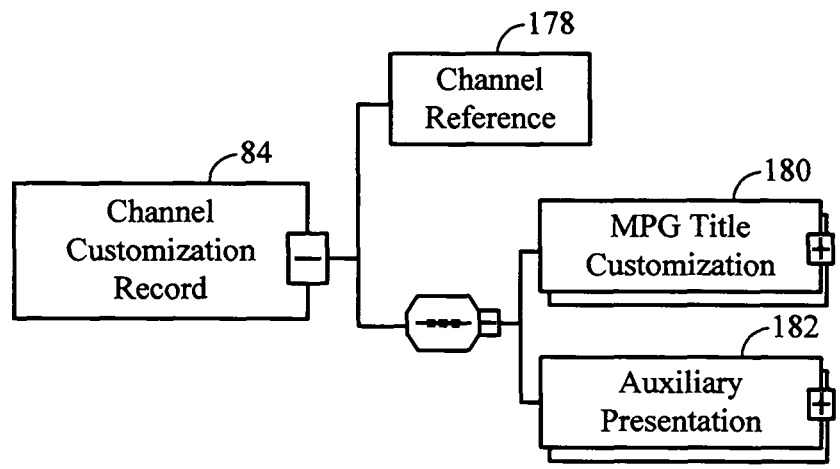
FIG. 13 is a schematic diagram of one embodiment of a channel customization record associated with the MPG block record of FIG. 3.

Referring to FIGS. 3 and 13, channel customization record 84 defines one or more MPG title customization records 180 for a particular channel 26, as defined by a channel reference 178 and as offered by a content retailer 24, which are associated with a base service 16 represented by the MPG title. Channel reference 178 comprises a channel identifier for a channel 26 that is customized by channel customization record 84. In other words, channel reference 178 identifies a channel record, stored within content server 60, which identifies attributes for the given channel, including: a unique channel identifier; a validity time that determines when the channel record is valid; a channel weight 153 (FIG. 1) that determines an order of the channel versus other channels in a list, i.e. where a channel with a lower weight is listed prior to a channel with a higher weight; channel language specific data which provides a channel name, description, and associated URL for one or more given languages associated with the channel; a base service reference that identifies a base service record, stored in content server 60, which provides the attributes of the given base service being customized and presented as the given channel; channel-specific auxiliary service references that identify auxiliary services 50 associated with the channel; and a channel icon, which may be a resident file or a reference to a file having a graphic content, for display on MPG 40. Further, if the service is an auxiliary service 50, channel customization record 84 may also specify the available content, such as an auxiliary presentation record 182, for the auxiliary service 50 associated with the MPG title for a particular channel 26.

Figure 14:
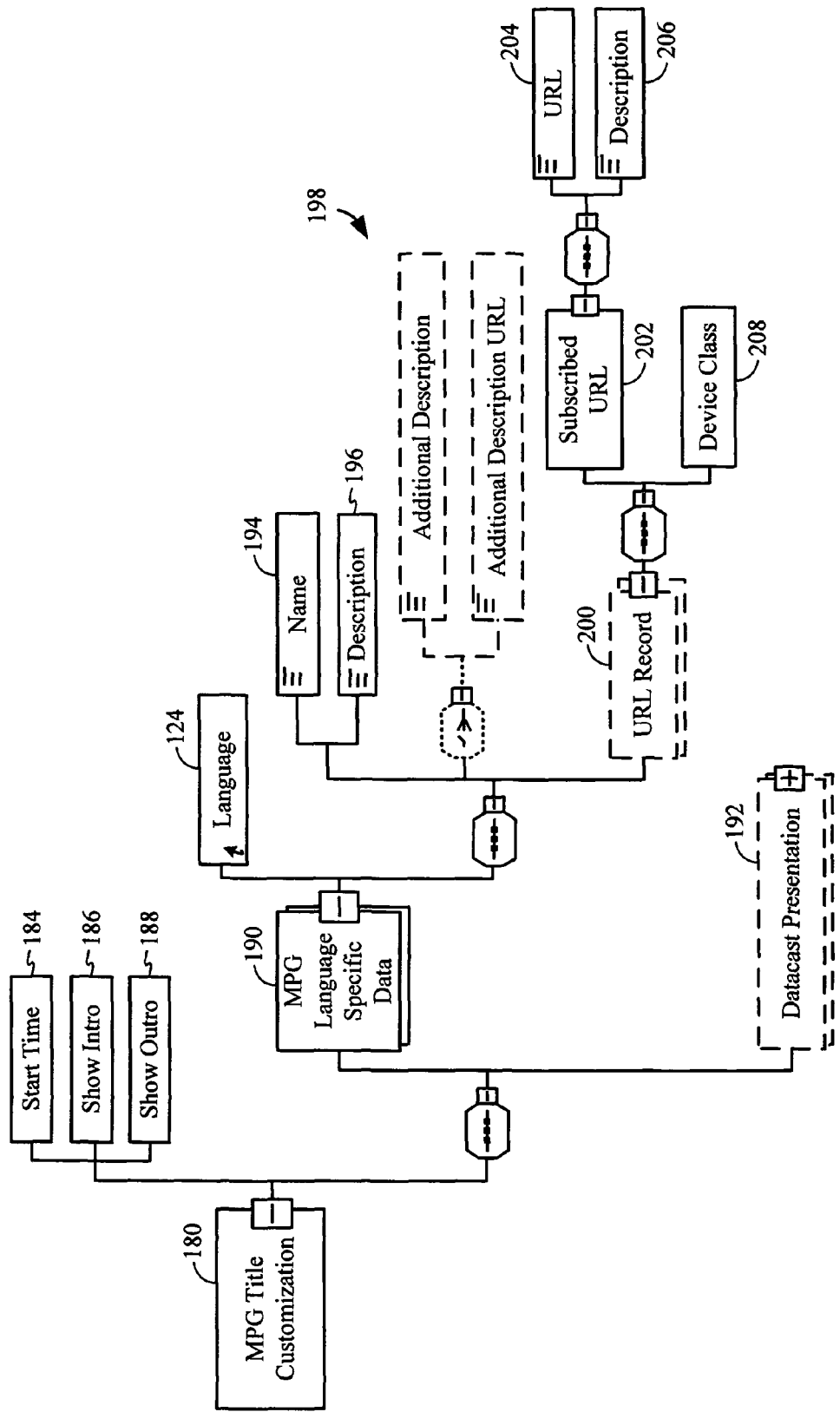
FIG. 14 is a schematic diagram of one embodiment of an MPG title customization record associated with the channel customization record of FIG. 13.

Referring to FIGS. 13 and 14, in one embodiment, each MPG title customization record 180 may specify a list of MPG customization elements. Each MPG customization element causes one or more of the elements of MPG title language specific data 118 (FIG. 6) to be overridden when the MPG title is accessed by the user through the respective channel 26 associated with the respective content retailer 24. In one embodiment, each MPG title customization record 180 includes a start time 184 which is a time having a value equal to the corresponding MPG title start time 100 (FIG. 6) associated with the MPG title customized by the respective MPG title customization record 180. Further, each MPG title customization record 180 may include a show intro indicator 186 and a show outro indicator 188, which respectively indicate if the device shall introduce and/or follow the presentation with an intro and/or an outro, described in detail below, obtained from the respective auxiliary service 50 associated with the respective channel 26.

Additionally, each MPG title customization record 180 may include one or more MPG language specific data records 190 and one or more datacast presentation records 192. Each MPG language specific data record 190 may specify an MPG title name 194 and an MPG title description 196 associated with a given language 124, and may further provide customized additional description 198 and define customized URL records 200 where a user can obtain further information about the MPG title, superseding the corresponding name 120, description 122, additional description 125 and URL records 126 associated with the corresponding MPG title language specific data 118 (FIG. 6) for the same language 124. As such, customized additional description 198 may comprise a customized additional description and a customized URL description, and customized URL records 200 may include one or more subscribed URLs 202 suitable for presentation to a user who is subscribed to the respective channel 26. Subscribed URLs 202 may include a URL 204 that points to an internal file or external reference, as well as a corresponding URL description 206 that describes the resource accessed by URL 204. Further, MPG language specific data record 190 may further include a customized data class record 208, which has customized components that supersedes the components of data class record 134 (FIG. 8).

Figure 15:
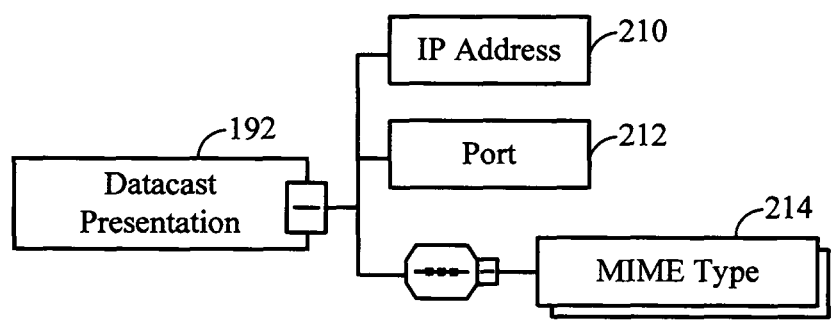
FIG. 15 is a schematic diagram of one embodiment of a datacast presentation record associated with the MPG title customization record of FIG. 14.

Referring to FIGS. 14 and 15, each datacast presentation record 192 may specify one or more datacast presentation elements, which replace the elements of the IP datacast presentation record 152 (FIGS. 6 and 11) associated with the respective base service 16 when the base service is accessed through the respective channel 26. Each datacast presentation record 192 may define an IP address 210, an IP port 212 and a MIME type 214, each being a customized version that replaces the corresponding base versions previously discussed in FIGS. 6 and 11.

Figure 16:
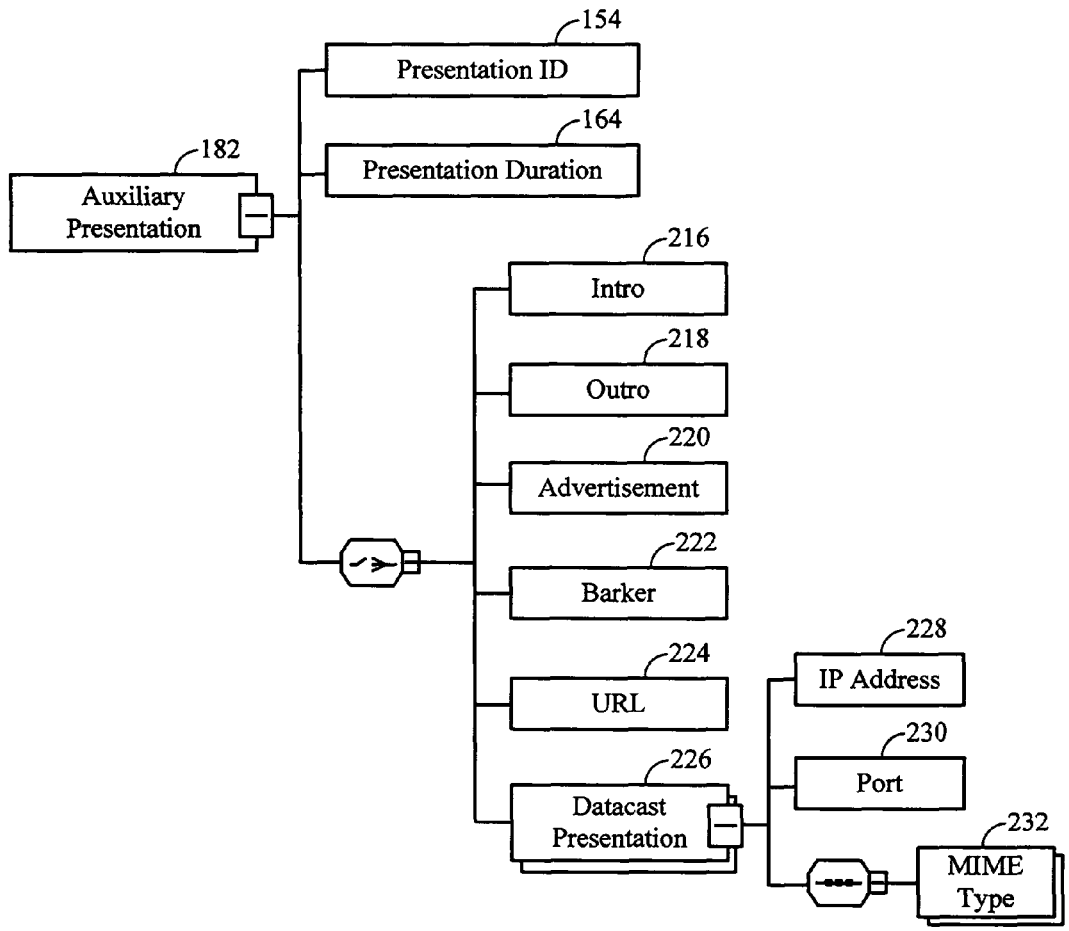
FIG. 16 is a schematic diagram of one embodiment of an auxiliary presentation record associated with the channel customization record of FIG. 13.

Referring to FIGS. 13 and 16, if the service is an auxiliary service 50, then the channel customization record 84 may specify one or more auxiliary presentation records 182. Each auxiliary presentation record 182 defines an auxiliary presentation 48, such as by referencing a presentation identification 154, and may further define a presentation duration 164, which is currently valid for the respective auxiliary service 50. Further, each auxiliary presentation record 182 may include at least one of an intro 216, an outro 218, an advertisement 220, a barker 222, a URL 224, and one or more IP datacasts 226.

In one embodiment, intro 216 includes content provided by auxiliary presentation 182 that is presented to the user ahead of content associated with the MPG title. Outro 218 includes content provided by auxiliary presentation 182 that is presented to the user behind content associated with the MPG title. Advertisement 220 includes content provided by auxiliary presentation 182 that is presented to the user during the presentation of content associated with the MPG title. Barker 222 includes content provided by auxiliary presentation 182 that may be presented to users who attempt to access the MPG title of a given channel 26 when they are not subscribed to that channel. URL 224 includes content, such as URL information, provided by auxiliary presentation 182 that is processed and presented to the user concurrently with a presentation of content associated with the MPG title. Further, each IP datacast 226 includes content provided by auxiliary presentation 182 that is processed and presented to the user concurrently with presentation of the content associated with the MPG title. Further, each IP datacast 226 may identify an IP address 228, a port 230, and one or more MIME types 232, each as previously described, associated with auxiliary presentation 182.

Figure 17:
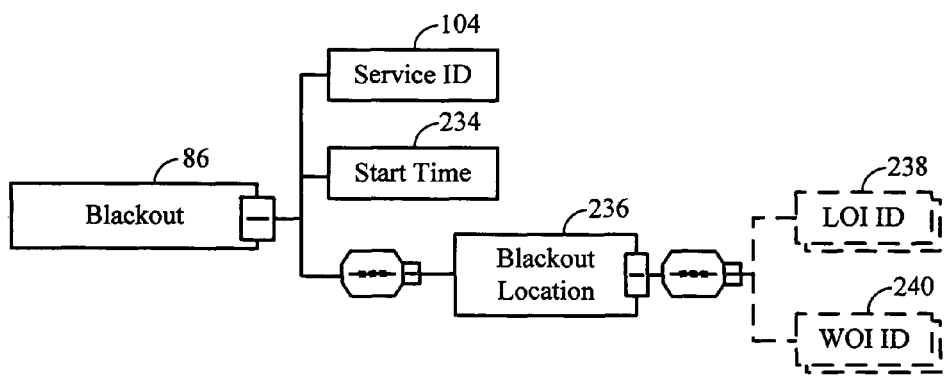
FIG. 17 is a schematic diagram of one embodiment of a blackout record associated with the MPG block record of FIG. 3.

Referring to FIGS. 3 and 17, MPG block 72 may further include one or more blackout records 86 for any or all MPG title records 80 associated with real-time presentations in MPG Block 72. Each blackout record 86 identifies the respective base service 16 that is to be blacked out, such as by including a service identification 104 corresponding to the service. Further, each blackout record 86 identifies a start time 234, which corresponds with MPG title start time 100 (FIG. 6) of the respective MPG title record 80 that is blacked out through the given blackout record 86. Additionally, each blackout record 86 include a blackout location 236, which is a geographic location in which the associated MPG title record 80 is blacked out. In one embodiment, for example, blackout location 236 includes one or more local-area grouping of infrastructure (LOI) identifiers 238 and/or one or more wide-area grouping of infrastructure (WOI) identifiers 240. Each LOI identifier 238 identifies a logical grouping of the infrastructure deployed to provide MDS 12 with network coverage in a specific local area. Each WOI identifier 240 identifies a logical grouping of the infrastructure deployed to provide MDS 12 with network coverage in a specific wide area. A "multiplex" defines the set of flows available in a given LOI or WOI.

Figure 18:
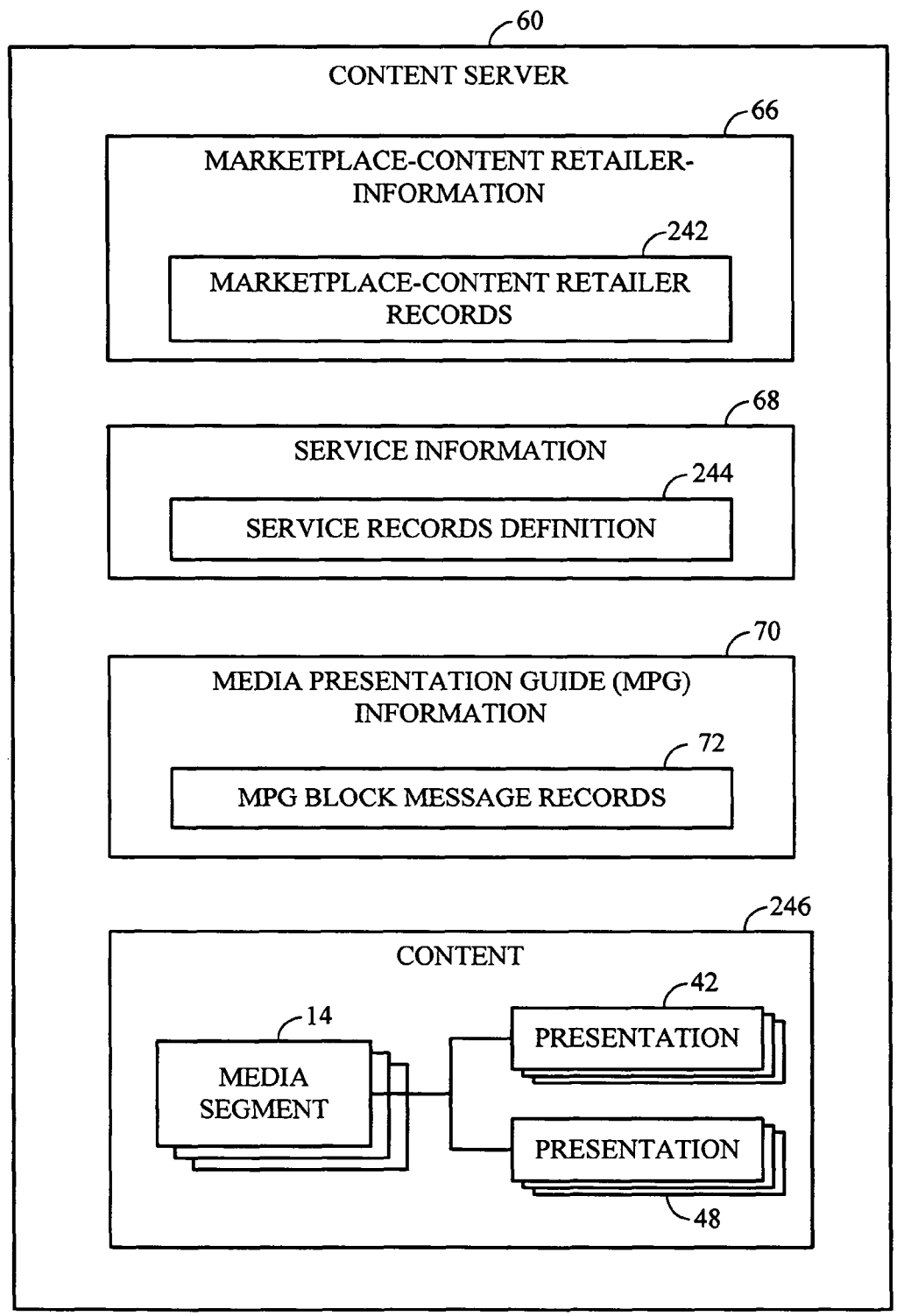
FIG. 18 is a schematic diagram of one embodiment of data and records stored by content server 60 of FIG. 1.

Referring to FIG. 18, the previously mentioned one or more content servers 60 therefore store the above-defined MPG block message records 72 as MPG information 70, along with marketplace-content retailer information 66 and associated records 242, service information 68 and associated records 244, and content 246, which includes media segments 14 and/or presentations 42, 48.

In one embodiment, each marketplace-content retailer record 242 includes: a unique marketplace-content retailer identification; basic information about the marketplace-content retailer, such as a name; one or more package records that identify the packages associated with the marketplace-content retailer, including the package name, description and language, the package pricing, a reference to one or more tiers 32 associated with each package, a package characteristic, for example, identifying the package as a parent package, an autosubscribe package, a closed package or an excluded package an identifier of an associated BCS provider 30, an identification of one or more associated auxiliary services 50 associated with the package, and an identification of available areas associated with the package, such as one or more LOI and/or WOI identifiers; one or more tier records associated with the marketplace-content retailer, including tier identifiers and one or more channel references and/or auxiliary service references associated with the tier; one or more channel records associated with the marketplace-content retailer, including channel identifiers, channel weights, channel language specific data, channel base service references that identify the base service associated with the channel, channel auxiliary service references that identify one or more auxiliary services associated with the channel, and a channel icon; one or more auxiliary service references that identify an auxiliary service associated with the marketplace-content retailer; and an end user license agreement (EULA) reference that defines terms for accessing the EULA associated with the content retailer.

Further, in one embodiment, each service record 244 includes information about one or more base services 16 and/or auxiliary services 50 associated with each marketplace-content retailer record 242. For example, in one embodiment, each base service record may include one or more of: a service identifier; a validity time, which defines when the record becomes active; a corporate affiliation of the service; an abbreviated name for the service; a genre associated with the service; a default language associated with the service; an identification of a service type, e.g. real-time, non real-time, per MPG title, datacast; one or more service language specific data records that define language specific attributes associated with the service (i.e. this is the service level equivalent to MPG title language specific data 118 (FIG. 8)); capability requirements associated with the service, e.g. memory/storage requirements; a rating associated with the service; an available area associated with the service, such as one or more LOI and/or WOI areas; one or more flow records associated with the service which defines the attributes of the given flow used to transport a component of the service; and one or more service icons associated with the service.

Thus, referring to FIGS. 1 and 18, marketplace-content retailer records 242 comprise the data and information associated with the respective packages 34, tiers 32, and channels 26 of each content retailer 24 and/or BCS provider 30 of system 10. Service records 244 comprise the data and information associated with the respective base services 16 and auxiliary services 50 of system 10. Further, MPG block message records 72 comprise the data and information associated with the specific presentations and services associated with each channel 26 associated with each content retailer 24 and/or BCS provider 30.

Figure 19:
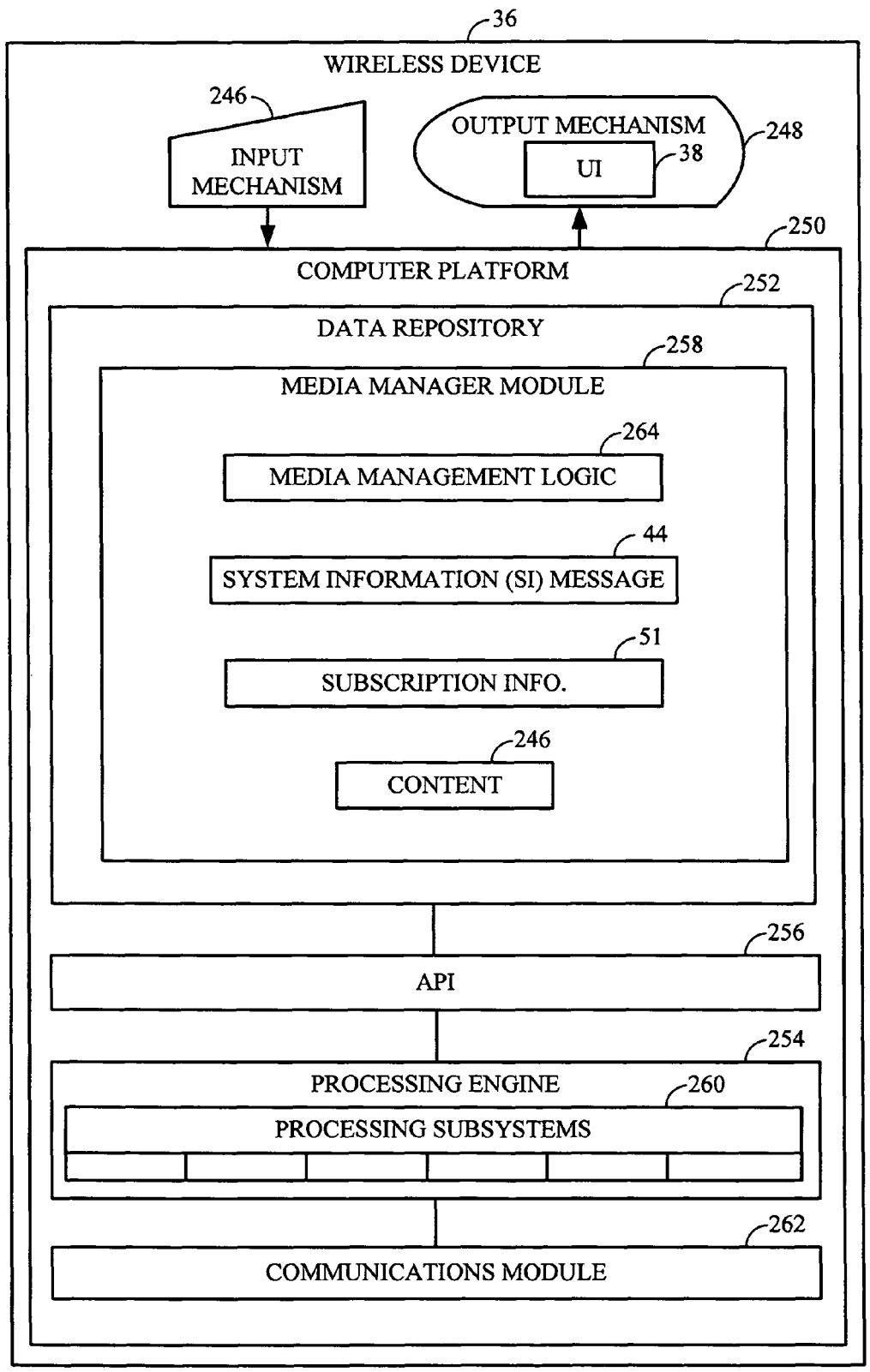
FIG. 19 is a schematic diagram of one embodiment of functional components of the wireless device of FIG. 1.

Referring to FIG. 19, in one embodiment, wireless device 36 has input mechanism 246 for generating inputs into wireless device, and output mechanism 248 for generating information for consumption by the user of the wireless device. For example, input mechanism 246 may include a mechanism such as a key or keyboard, a mouse, a touch-screen display, voice recognition module, etc. Further, for example, output mechanism 248 may include user interface 38, which may be a display, an audio speaker, a haptic feedback mechanism, etc.

Further, wireless device 36 has computer platform 250 that can transmit data across wireless network 46, and that can receive and execute software applications and display data transmitted from MDS 12 or another computer device connected to wireless network 46. Computer platform 250 includes a data repository 252, which may comprise volatile and nonvolatile memory such as read-only and/or random-access memory (RAM and ROM), EPROM, EEPROM, flash cards, or any memory common to computer platforms. Further, data repository 252 may include one or more flash memory cells, or may be any secondary or tertiary storage device, such as magnetic media, optical media, tape, or soft or hard disk.

Further, computer platform 250 also includes a processing engine 254, which may be an application-specific integrated circuit ("ASIC"), or other chipset, processor, logic circuit, or other data processing device. Processing engine 254 or other processor such as ASIC may execute an application programming interface ("API") layer 256 that interfaces with any resident programs, such as a media manager module 258, in data repository 252 of the wireless device. API 256 is a runtime environment executing on the respective wireless device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices.

Processing engine 254 includes various processing subsystems 260 embodied in hardware, firmware, software, and combinations thereof, that enable the functionality of wireless device 36 and the operability of the wireless device on wireless access network 46. For example, processing subsystems 260 allow for initiating and maintaining communications, exchanging data, and executing multimedia presentations. In one embodiment, such as in a cellular telephone, processing engine 254 may include one or a combination of processing subsystems 260, such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface, sleep, data services, security, authentication, USIM/SIM, voice services, graphics, USB, multimedia such as MPEG, GPRS, etc. For the disclosed embodiments, processing subsystems 260 of processing engine 256 may include any subsystem components that interact with applications executing on computer platform 250. For example, processing subsystems 260 may include any subsystem components which receive data reads and data writes from API 256 on behalf of media manager module 258.

Computer platform 250 may further include a communications module 262 embodied in hardware, firmware, software, and combinations thereof, that enables communications among the various components of the wireless device 36, as well as between wireless device 36 and wireless access network 46. For example, communications module 262 may include a transceiver module for wireless communications with MDS 12 and/or wireless access network 46.

Media manager module 258 operates to manage media subscription, media receipts, and media playing/viewing activities on wireless device 36. Media manager module 258 may include any hardware, software, firmware and/or other set of executable instructions operable to manage the media-related activities on wireless device 36. Further, media manager module 258 and/or data repository 252 store SI message 44 and its associated content information and the content for viewing/playing on user interface 38. In one embodiment, media manager module 258 includes media management logic 264 that provides the capability to receive, store, provide access to and play/display media-related information on wireless device 36. For example, media management logic 264 operates to parse SI message 44 and display MPG 40 on user interface 38 and/or provide a view of a channel 26, including presenting real-time and non-real-time content. Similarly, media management logic 264 operates to manage subscriptions to packages 34 with content retailers 24 and/or BCS providers 30, and store the associated subscription information 51. For example, subscription information 51 may be any information, such as a content retailer identification, a package identification, keys, etc., stored on device 36 relating to subscriptions to or activations on wireless networks and/or subscriptions to multimedia packages 34. Further, media management logic 264 operates to manage the acquisition and storage, including memory management functions, associated with a non real-time presentation based on the respective contact window, as well as managing the playing/displaying of the content. Additionally, media management logic 264 operates with communications module 262 to receive and play real-time presentations and datacast presentations.

For example, in one embodiment, device 36 may subscribe to or be activated on wireless access network 46. Typically, an activation of device 36 onto network 46 limits the device to receiving communications and/or multimedia service from one content retailer 24 and/or BCS provider 30. Further, this activation allows device 36 to receive a broadcast including SI message 44 (FIG. 1), even if the device is not subscribed to any packages 34. Because of being broadcast, in one embodiment, SI message 44 includes all of the MPG block records 72 defined by all of the content retailers. Further, in this case, SI message 44 and/or its corresponding flow 45 may include all of the content for a given schedule of programming, i.e. all of the base services and base service presentations and all of the auxiliary services and auxiliary presentations. In this example, upon receiving SI message 44, media manager module 258 is operable to filter out all records and/or content not relevant to the device based on the content-retailer associated with the device, and further based on the packages subscribed to by the device. In this manner, media manager module 258 constructs retailer-specific, customized versions of MPG 40, and/or a subscription menu, and/or custom generation of combined presentations 42 and 48 on device 36, and optimizes review of SI message 44 and/or content in flow 45 by only addressing records and/or content relevant to the device.

Figure 20:
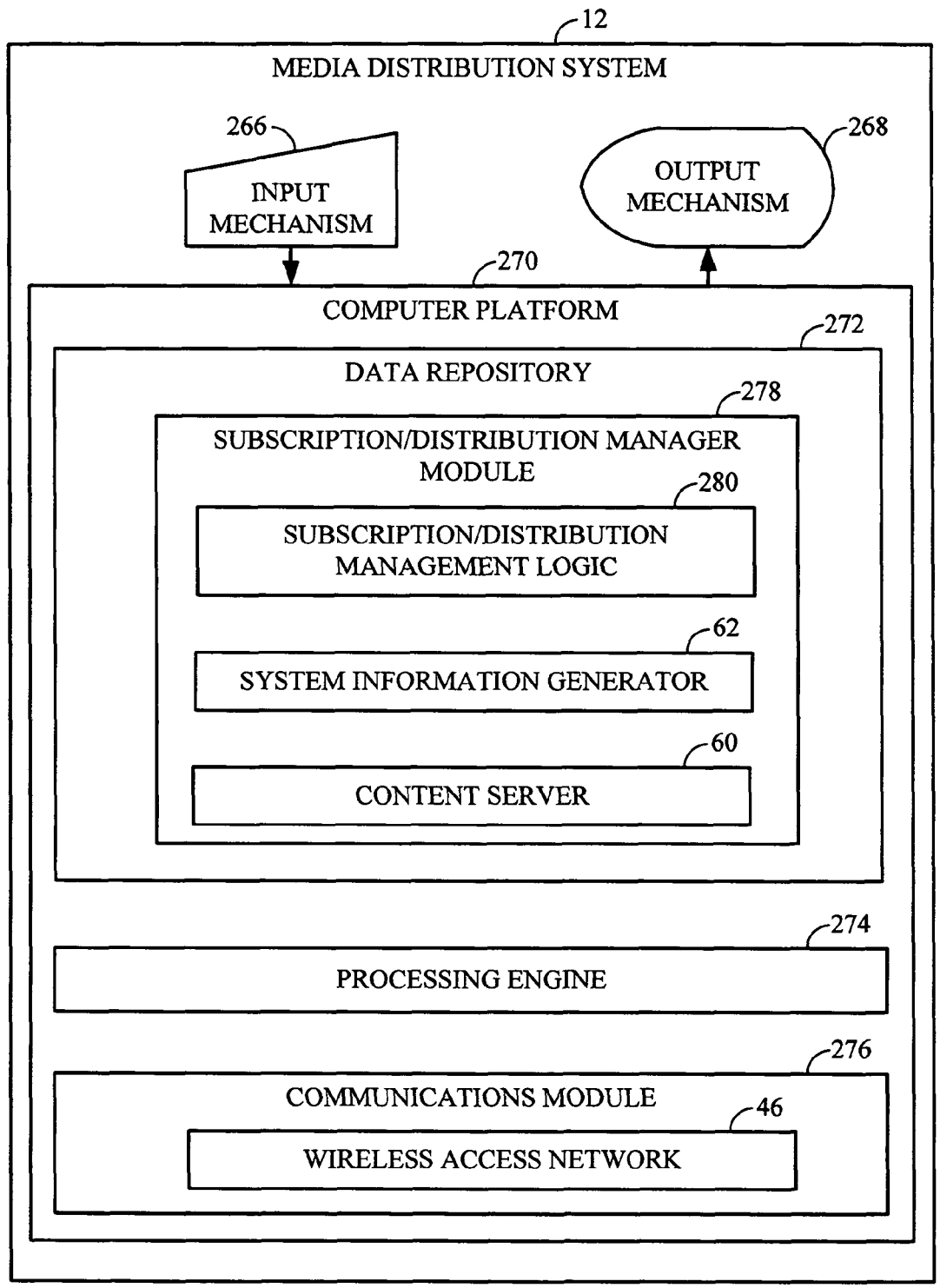
FIG. 20 is a schematic diagram of one embodiment of functional components of the media distribution system of FIG. 1.

Referring to FIG. 20, in one embodiment, MDS 12 may comprise at least one of any type of hardware, software, firmware, server, personal computer, mini computer, mainframe computer, or any computing device either special purpose or general computing device. Further, there can be separate servers or computer devices and/or networks associated with MDS 12 that work in concert to receive, manipulate and provide data in usable formats to parties, and/or to provide a separate layer of control in the data flow between devices and networks and MDS 12.

MDS 12 has input mechanism 266 for generating inputs into MDS 12, and output mechanism 268 for generating information for consumption by an operator of MDS 12. For example, input mechanism 266 may include a mechanism such as a key or keyboard, a mouse, a touch-screen display, voice recognition module, etc. Further, for example, output mechanism 268 may be a display, an audio speaker, a haptic feedback mechanism, etc. Additionally, input mechanism 266 may be a remote device, such as a remote computer or workstation, which has access to MDS 12. In one embodiment, for example, input mechanism 266 may be utilized by an operator to enter service attributes 20, custom attributes 22 or custom channel attributes 28, and for establishing and/or manipulating information associated with presentations 42, 48, channels 26, tiers 32 and packages 34.

Further, MDS 12 has one or a plurality of resident or distributed computer platforms 270 that can receive and transmit data, and that can receive and execute software applications and display data. Computer platform 270 includes a data repository 272, which may comprise volatile and non-volatile memory such as read-only and/or random-access memory (RAM and ROM), EPROM, EEPROM, flash cards, or any memory common to computer platforms. Further, data repository 272 may include one or more flash memory cells, or may be any secondary or tertiary storage device, such as magnetic media, optical media, tape, or soft or hard disk. In one embodiment, for example, data repository 272 includes the one or more content servers 60.

Further, computer platform 270 also includes a processing engine 274, which may be an application-specific integrated circuit ("ASIC"), or other chipset, processor, logic circuit, or other data processing device for carrying out executable instructions.

Computer platform 270 may further include a communications module 276 embodied in hardware, firmware, software, and combinations thereof, that enables communications among the various components of MDS 12, as well as between MDS 12 and wireless device 36. For example, communications module 276 includes wireless access network 46.

Further, a subscription/distribution manager module 278 resides on computer platform 270 which operates to manage all of the media distribution functions described herein performed by MDS 12. Subscription/distribution manager module 278 may include any hardware, software, firmware and/or other set of executable instructions operable to manage the media-related activities on MDS 12. Further, in one embodiment, subscription/distribution manager module 278 includes subscription/distribution management logic 280 that provides MDS 12 with the capability to receive, store, manipulate, provide access to and distribute content and content-related information. For example, subscription/distribution management logic 280 operates to receive content and content-related information, as well as content retailer-specific information, such as customization information, auxiliary services, auxiliary presentations, channel information, tier information and package information. Further, subscription/distribution management logic 280 is operable to receive, process and transmit subscription related information, such as subscription requests, the corresponding approvals or denials, and the management of digital rights based on an approved subscription request. Additionally, subscription/distribution manager module 278 may include SI generator 62, discussed above.

Figure 21:
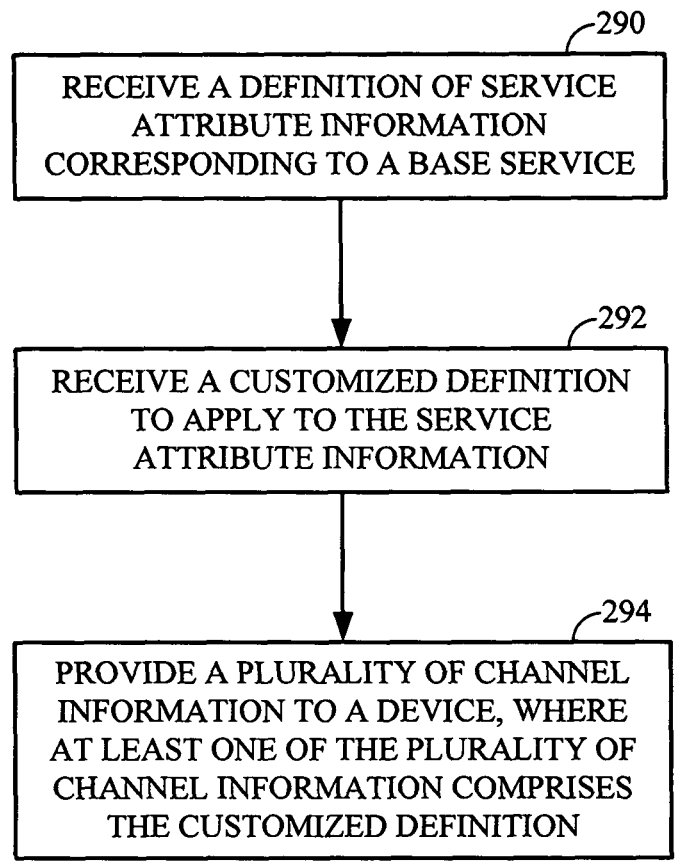
FIG. 21 is a flowchart of one embodiment of a method for providing content information.

In operation, referring to FIG. 21, one embodiment of a method of providing content information comprises receiving a definition of service attribute information corresponding to a base service (Block 290). For example, in one embodiment, MDS 12 may receive service attribute information 20, such as from a content provider 18, a content retailer 24 and/or a BCS provider 30. Additionally, for example, service attribute information 20 may be defined within service information 68 (FIG. 2) of SI message 44, and as identified for each MPG title record 80 (FIG. 6) by service reference 104. Further, for example, the base service may comprise base service 16, including one or more presentations 42 formed from one or more media segments 14, which is operable to provide at least a portion of a presentation to a device.

Further, the method includes receiving a customized definition to apply to the service attribute information (Block 292). For example, in one embodiment, each content retailer 24 provides custom attributes 22 that supersede corresponding ones of the service attributes 20 on a service by service basis, thereby defining channels 26 that are specifically customized for each content retailer 24. Further, for example, custom attributes 22 may include presentations, such as intros, outros, advertisements, barkers, URLs and datacasts, from an auxiliary service 50 that may be combined with a base service 16 to define a content-retailer-specific channel 26. Additionally, for example, custom attributes 22 may replace service attributes 20 on a per presentation basis, as well as on a per channel basis. In one embodiment, for example, the customized definitions may be provided by channel customization record 84 (FIGS. 3 and 13), MPG title customization record 180 (FIGS. 13 and 14) and auxiliary presentation record 182 (FIGS. 13 and 16).

Additionally, the method includes providing a plurality of channel information to a device, where at least one of the plurality of channel information comprises the customized definition (Block 294). For example, in one embodiment, the channel information comprises the customized service attribute information. Further, for example, MDS 12 may send SI message 44 through wireless access network 46 and to wireless device 36. SI message 44 includes marketplace-content retailer information 66, service information 68 and MPG information 70 that may be utilized by wireless device 36 to generate a MPG 40 displaying a customized list of channels 26, and/or to view customized content, such as presentation 42 and/or 48 on a respective customized channel 26. In other words, in this embodiment, SI message 44 includes the retailer-specific customized definitions that are filtered by the device based on an associated retailer, thereby allowing the device to present the retailer-specific, customized information.

Figure 22:
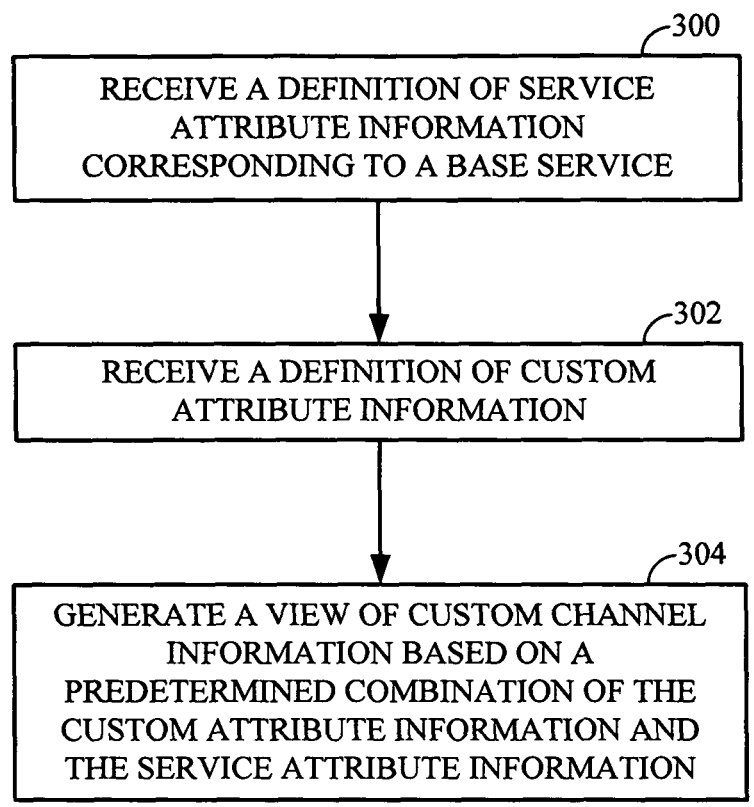
FIG. 22 is a flowchart of one embodiment of a method for displaying content information.

Referring to FIG. 22, in another embodiment, a method for displaying content information comprises receiving a definition of service attribute information corresponding to a base service (Block 300). In one embodiment, for example, wireless device 36 receives SI message 44 from MDS 12 via wireless access network 46. SI message 44 includes service information 68, which includes service attributes 20. Further, for example, the service attributes 20 are related to a base service 16, which includes one or more presentations 42 formed from one or more media segments 14, which is operable to provide at least a portion of a presentation to a device. Additionally, for example, service attribute information 20 may be defined within service information 68 (FIG. 2) of SI message 44, and as identified for each MPG title record 80 (FIG. 6) by service reference 104.

Further, the method includes receiving a definition of custom attribute information (Block 302). For example, in one embodiment, wireless device 36 receives SI message 44 from MDS 12 via wireless access network 46. SI message 44 includes marketplace-content retailer information 66 and MPG information 70, either or both of which include custom attributes 22. In this case, custom attributes 22 reflect specific information corresponding each content retailer 24 and/or BCS provider 30 designed to customize a respective channel 26. Further, for example, the customized definitions may be provided by channel customization record 84 (FIGS. 3 and 13), MPG title customization record 180 (FIGS. 13 and 14) and auxiliary presentation record 182 (FIGS. 13 and 16).

Additionally, the method further includes generating a view of custom channel information based on a predetermined combination of the custom attribute information and the service attribute information (Block 304). For example, in one embodiment, media manager module 258 of wireless device 36 operates on SI message 44 to construct custom channel information based on replacing at least a portion of service attributes 20 with a corresponding portion of custom attributes 22. In particular, media manager module 258 replaces service information 68 with marketplace-content retailer information 66 and/or MPG information 70. As a result, media manager module 258 generates a user interface 38 that includes at least one of: a MPG 40 providing an ordered list of customized channels 26 specific for each content retailer 24; and, a presentation 42 provided by a base service 16, where the presentation may be supplemented with an auxiliary presentation 48 from an auxiliary service 50 based on content-retailer-specific custom attributes 22.

Thus, the described embodiments allow each of a plurality of content retailers 24 and/or BCS providers 30 to provide a customized view of a base service 16, including a customized media presentation guide 40 and customized presentations 42, 48, to devices, such as wireless device 36, subscribed to packages 34 provided by the corresponding content retailer 24 and/or BCS provider 30.

Additionally, it should be noted that the information contained in MPG block 72 (FIG. 2) may also be utilized to construct a custom subscription menu from which a user may review package information and subscribe to packages. For example, the information relating to the packages being offered for subscription may be based on service references 104 (FIG. 6) associated with MPG title records 80 (FIG. 6) of the given content retailer 24.

In summary, in the present system, all of the channel attributes are customizable per content retailer. Channels may have associated weights that can be used to order the presentation of the services in the guide. Further, the weights can also be used to determine the priority of memory management on the device for each service. As such, the described channels allow re-definitions of service information, such as the name and description of the service, in multiple languages. Additionally, URLs can also be associated with each language to allow the user to get additional information about the service. Each channel defines a base service which is the service it is customizing, and may include an indicator as to whether that channel may be excluded from the guide by the subscriber. Channels also can have associated auxiliary services that can deliver content specific to the content retailer such as advertisements, URLs, barkers, supplementary content, etc. The device can use the data from the auxiliary services to complement the base service information. An example would be providing statistics for a baseball game being shown along with the presentation from the base service. Auxiliary services can also provide: content that is played at the beginning or end of a presentation provided by the base service; content that is played as a promotion for an unsubscribed channel; and/or an advertisement for merchandise or upcoming programs.

While the foregoing disclosure shows illustrative embodiments, it should be noted that various changes and modifications could be made herein without departing from the scope of the described embodiments as defined by the appended claims. Furthermore, although elements of the described embodiments may be described or claimed in the singular, the plural is contemplated unless limitation to the singular is explicitly stated.

What is claimed is:

1. A method for providing content information, comprising:
   receiving, at a media distribution system, service attribute information corresponding to a base service;
   receiving, at the media distribution system, custom attribute information corresponding to the base service, wherein the custom attribute information further defines at least a portion of the service attribute information and the custom attribute information customizes the service attribute information for each one of a plurality of content retailers; and
   broadcasting, by the media distribution system, a system information message to a device, wherein the system information message includes the service attribute information, a media presentation guide, and the custom attribute information, wherein the device applies the custom attribute information to said at least the portion of the service attribute information in order to customize at least one channel information corresponding to the base service and at least one of the content retailers.

2. The method of claim 1, wherein receiving the custom attribute information further comprises receiving custom attribute information associated with each one of a plurality of retailers operable to broadcast to the device the base service corresponding to the custom attribute information.

3. The method of claim 2, wherein receiving the custom attribute information further comprises receiving custom attribute information for the service attribute information receivable by the device from at least a respective one of the plurality of retailers.

4. The method of claim 1, wherein receiving the custom attribute information further comprises receiving custom attribute information that directs at least a portion of the service attribute information for replacement by a corresponding portion of the custom attribute information.

5. The method of claim 1, wherein receiving the custom attribute information further comprises receiving custom attribute information identifying a custom attribute of at least one of a channel icon, a channel weight, a name of a presentation, a description of the presentation, a reference to additional information about the presentation, a description of the reference to additional information, a rating associated with the presentation, and an indication of a type of device required to access the reference to additional information.

6. The method of claim 1, wherein receiving the custom attribute information comprises receiving custom attribute information that identifies a custom datacast presentation element associated with a presentation.

7. The method of claim 1, wherein receiving the custom attribute information further comprises receiving custom attribute information that associates the base service corresponding to the customized service attribute information with an auxiliary service that broadcasts auxiliary presentations to supplement the base service.

8. The method of claim 7, wherein receiving the custom attribute information further comprises identifying at least one of an intro, an outro, an advertisement, a barker, a universal resource locator (URL), and a datacast presentation to supplement the base service.

9. The method of claim 1, wherein receiving the custom attribute information further comprises identifying a custom attribute of at least one of an indicator that determines if a presentation corresponding to the customized service attribute information comprises an auxiliary presentation, and an identification of the auxiliary presentation associated with the presentation corresponding to the customized service attribute information.

10. The method of claim 1, wherein a predetermined one of the plurality of the content retailers is operable to broadcast a presentation to the device.

11. The method of claim 1, wherein broadcasting further comprises broadcasting the media presentation guide to the device based on the received custom attribute information.

12. The method of claim 1, further comprising broadcasting a customized presentation to the device based on the received custom attribute information.

13. The method of claim 1, wherein receiving the service attribute information corresponding to the base service further comprises receiving presentation-specific service attribute information for at least one of a plurality of presentations, and wherein the receiving the custom attribute information further comprises receiving customized presentation-specific service attribute information for at least the one presentation.

14. A computer program resident in a computer readable medium that, when executed, directs a computer device to perform the actions of:
   receiving, at a media distribution system, service attribute information corresponding to a base service;
   receiving, at the media distribution system, custom attribute information corresponding to the base service, wherein the custom attribute information further defines at least a portion of the service attribute information and the custom attribute information customizes the service attribute information for each one of a plurality of content retailers; and
   broadcasting, by the media distribution system, a system information message to a device, wherein the system information message includes the service attribute information, a media presentation guide, and the custom attribute information, wherein the device applies the custom attribute information to said at least the portion of the service attribute information in order to customize at least one channel information corresponding to the base service and at least one of the content retailers.

15. The computer program of claim 14, wherein receiving the custom attribute information further comprises receiving custom attribute information associated with each one of a plurality of retailers operable to broadcast to the device the base service corresponding to the custom attribute information.

16. The computer program of claim 15, wherein receiving the custom attribute information further comprises receiving custom attribute information for the service attribute information receivable by the device from at least a respective one of the plurality of retailers.

17. The computer program of claim 14, wherein receiving the custom attribute information further comprises receiving custom attribute information that directs at least a portion of the service attribute information for replacement by a corresponding portion of the custom attribute information.

18. The computer program of claim 14, wherein receiving the custom attribute information further comprises receiving custom attribute information identifying a custom attribute of at least one of a channel icon, a channel weight, a name of a presentation, a description of the presentation, a reference to additional information about the presentation, a description of the reference to additional information, a rating associated with the presentation, and an indication of a type of device required to access the reference to additional information.

19. The computer program of claim 14, wherein receiving the custom attribute information comprises receiving custom attribute information that identifies a custom datacast presentation element associated with a presentation.

20. The computer program of claim 14, wherein receiving the custom attribute information further comprises receiving custom attribute information that associates the base service corresponding to the customized service attribute information with an auxiliary service that broadcasts auxiliary presentations to supplement the base service.

21. The computer program of claim 20, wherein receiving the custom attribute information further comprises identifying at least one of an intro, an outro, an advertisement, a barker, a universal resource locator (URL), and a datacast presentation to supplement the base service.

22. The computer program of claim 14, wherein receiving the custom attribute information further comprises identifying a custom attribute of at least one of an indicator that determines if a presentation corresponding to the customized service attribute information comprises an auxiliary presentation, and an identification of the auxiliary presentation associated with the presentation corresponding to the customized service attribute information.

23. The computer program of claim 14, wherein a predetermined one of the plurality of the content retailers is operable to broadcast a presentation to the device.

24. The computer program of claim 14, wherein broadcasting further comprises broadcasting a customized presentation to the device based on the received custom attribute information.

25. The computer program of claim 14, wherein receiving the service attribute information corresponding to the base service further comprises receiving presentation-specific service attribute information for at least one of a plurality of presentations, and wherein receiving custom attribute information further comprises receiving customized presentation-specific service attribute information for at least the one presentation.

26. At least one processor for performing the actions of:
   receiving, at a media distribution system, service attribute information corresponding to a base service;
   receiving, at the media distribution system, custom attribute information corresponding to the base service, wherein the custom attribute information further defines at least a portion of the service attribute information and the custom attribute information customizes the service attribute information for each one of a plurality of content retailers; and
   broadcasting, by the media distribution system, a system information message to a device, wherein the system information message includes the service attribute information, a media presentation guide, and the custom attribute information, wherein the device applies the custom attribute information to said at least the portion of the service attribute information in order to customize at least one channel information corresponding to the base service and at least one of the content retailers.

27. An apparatus for providing content information, comprising:
   means for receiving, at a media distribution system, service attribute information corresponding to a base service;
   means for receiving, at the media distribution system, custom attribute information corresponding to the base service, wherein the custom attribute information further defines at least a portion of the service attribute information and the custom attribute information customizes the service attribute information for each one of a plurality of content retailers; and
   means for broadcasting, by the media distribution system, a system information message to a device, wherein the system information message includes the service attribute information, a media presentation guide, and the custom attribute information, wherein the device applies the custom attribute information to said at least the portion of the service attribute information in order to customize at least one channel information corresponding to the base service and at least one of the content retailers.

28. The apparatus of claim 27, wherein the means for receiving the custom attribute information further comprises means for receiving custom attribute information associated with each one of a plurality of retailers operable to broadcast to the device the base service corresponding to the custom attribute information.

29. The apparatus of claim 28, wherein the means for receiving the custom attribute information further comprises means for receiving custom attribute information for the service attribute information receivable by the device from at least a respective one of the plurality of retailers.

30. The apparatus of claim 27, wherein the means for receiving the custom attribute information further comprises means for receiving custom attribute information that directs at least a portion the service attribute information for replacement by a corresponding portion of the custom attribute information.

31. The apparatus of claim 27, wherein the means for receiving the custom attribute information further comprises means for receiving custom attribute information identifying a custom attribute of at least one of a channel icon, a channel weight, a name of a presentation, a description of the presentation, a reference to additional information about the presentation, a description of the reference to additional information, a rating associated with the presentation, and an indication of a type of device required to access the reference to additional information.

32. The apparatus of claim 27, wherein the means for receiving the custom attribute information comprises means for receiving custom attribute information that identifies a custom datacast presentation element associated with a presentation.

33. The apparatus of claim 27, wherein the means for receiving the custom attribute information further comprises means for receiving custom attribute information that associates the base service corresponding to the customized service attribute information with an auxiliary service that broadcasts auxiliary presentations to supplement the base service.

34. The apparatus of claim 33, wherein the means for receiving the custom attribute information further comprises means for identifying at least one of an intro, an outro, an advertisement, a barker, a universal resource locator (URL), and a datacast presentation to supplement the base service.

35. The apparatus of claim 27, wherein the means for receiving the custom attribute information further comprises means for identifying a custom attribute of at least one of an indicator that determines if a presentation corresponding to the customized service attribute information comprises an auxiliary presentation, and an identification of the auxiliary presentation associated with the presentation corresponding to the customized service attribute information.

36. The apparatus of claim 27, wherein a predetermined one of the plurality of the content retailers is operable to broadcast a presentation to the device.

37. The apparatus of claim 27, further comprising means for broadcasting a customized presentation to the device based on the received custom attribute information.

38. The apparatus of claim 27, wherein the means for receiving the service attribute information corresponding to the base service further comprises means for receiving presentation-specific service attribute information for at least one of a plurality of presentations, and wherein the means for receiving the custom attribute information further comprises means for receiving a customized presentation-specific service attribute information for at least the one presentation.

39. An apparatus for providing content information, comprising:
   a content server for receiving service attribute information and to receive custom attribute information, wherein the service attribute information and the custom attribute information correspond to a base service, the custom attribute information further defines at least a portion of the service attribute information and the custom attribute information customizes the service attribute information for each one of a plurality of content retailers; and
   a generator module operable to broadcast a system information message to a device, wherein the system information message includes the service attribute information, a media presentation guide, and the custom attribute information, wherein the device applies the custom attribute information to said at least the portion of the service attribute information in order to customize at least one channel information corresponding to the base service and at least one of the content retailers.

40. The apparatus of claim 39, further comprising a customized channel information for each one of a plurality of retailers operable to broadcast to the device the base service corresponding to the customized channel information.

41. The apparatus of claim 39, wherein the customized channel information defines at least a portion of the service attribute information for replacement by a corresponding portion of the custom attribute information.

42. The apparatus of claim 39, wherein the customized channel information defines changing the service attribute information with the custom attribute information for at least one of a channel icon, a channel weight, a name of a presentation, a description of the presentation, a reference to additional information about the presentation, a description of the reference to additional information, a rating associated with the presentation, and an indication of a type of device required to access the reference to additional information.

43. The apparatus of claim 39, wherein the customized channel information defines changing the service attribute information with the custom attribute information for a datacast presentation element associated with a presentation.

44. The apparatus of claim 39, wherein the customized channel information defines an association between the base service and an auxiliary service that broadcasts auxiliary presentations to supplement the base service.

45. The apparatus of claim 44, wherein the auxiliary service comprises at least one of an intro, an outro, an advertisement, a barker, a universal resource locator (URL), and a datacast presentation to supplement the base service.

46. The apparatus of claim 39, wherein the customized channel information defines changing the service attribute information with the custom attribute information for at least one of an indicator that determines if a presentation comprises an auxiliary presentation, and an identification of the auxiliary presentation associated with the presentation.

47. The apparatus of claim 39, wherein a predetermined one of the plurality of the content retailers is operable to broadcast a presentation to the device.

48. The apparatus of claim 39, wherein the system information message includes a media presentation guide block that defines a media presentation guide on the device based on the customized channel information.

49. The apparatus of claim 39, wherein the content server is operable to broadcast a customized presentation to the device based on the customized channel information.

50. The apparatus of claim 39, wherein the service attribute information further comprises presentation-specific service attribute information for at least one of a plurality of presentations, wherein the custom attribute information comprises presentation-specific custom attribute information for at least the one presentation, and wherein the customized channel information defines changing the presentation-specific service attribute information with the presentation-specific custom attribute information for at least the one presentation.

51. A method for presenting content information, comprising:
   receiving via a broadcast service attribute information corresponding to a base service;
   receiving via a broadcast custom attribute information corresponding to the base service and to each one of a plurality of retailers, wherein the custom attribute information further defines the service attribute information;
   applying the custom attribute information to the service attribute information in order to customize at least one of a plurality of channel information corresponding to the base service; and
   generating a media presentation guide including the customized channel information based on combining the service attribute information with the custom attribute information associated with at least one of the content retailers.

52. The method of claim 51, wherein each one of the plurality of retailers is operable to provide broadcast to a device the base service.

53. The method of claim 52, further comprising receiving subscription information associated with a subscription to content broadcasted by one of the plurality of retailers, wherein the custom attribute information is associated with the one retailer associated with the subscription information.

54. The method of claim 52, further comprising receiving the service attribute information corresponding to the base service for each of a plurality of base services, and wherein receiving the custom attribute information further comprises receiving custom attribute information for each of the service attribute information corresponding to each of the plurality of base services receivable by the device from at least a respective one of the plurality of retailers.

55. The method of claim 51, wherein generating further comprises replacing at least a portion of the service attribute information with a corresponding portion of the custom attribute information.

56. The method of claim 51, wherein the custom attribute information further comprises at least one of a channel icon, a channel weight, a name of a presentation, a description of the presentation, a reference to additional information about the presentation, a description of the reference to additional information, a rating associated with the presentation, and an indication of a type of device required to access the reference to additional information.

57. The method of claim 51, wherein generating further comprises generating a custom datacast presentation associated with a presentation.

58. The method of claim 51, wherein generating comprises associating the base service with an auxiliary service that broadcasts auxiliary presentations to supplement the base service.

59. The method of claim 58, further comprising presenting at least one of an intro, an outro, an advertisement, a barker, a universal resource locator (URL), and a datacast presentation as a supplement to the base service.

60. The method of claim 51, wherein receiving the custom attribute information further comprises receiving custom attribute information for each of a plurality of content retailers, and wherein generating the media presentation guide including the customized channel information further comprises replacing at least a portion of the service attribute information with a respective portion of the custom attribute information corresponding to the one of the plurality of content retailers broadcasting the corresponding base service to a device.

61. The method of claim 51, wherein generating further comprises generating the media presentation guide based on the custom attribute information.

62. The method of claim 51, wherein generating further comprises generating a customized presentation based on the custom attribute information.

63. The method of claim 51, wherein receiving the service attribute information corresponding to the base service further comprises receiving presentation-specific service attribute information for at least one of a plurality of presentations, wherein receiving the custom attribute information further comprises receiving presentation-specific custom attribute information for at least the one presentation, and wherein generating the media presentation guide including the customized channel information further comprises replacing the presentation-specific service attribute information with the presentation-specific custom attribute information for a corresponding presentation.

64. The method of claim 51, further comprising generating a view of a custom channel including a combination of real-time media and non real-time media.

65. A computer program resident in a computer readable medium that, when executed, directs a computer device to perform the actions of:
receiving via a broadcast service attribute information corresponding to a base service;
receiving via a broadcast custom attribute information corresponding to the base service and to each one of a plurality of retailers, wherein the custom attribute information further defines the service attribute information;
applying the custom attribute information to the service attribute information in order to customize at least one of a plurality of channel information corresponding to the base service; and
generating a media presentation guide including the customized channel information based on combining the service attribute information with the custom attribute information associated with at least one of the content retailers.

66. The computer program of claim 65, wherein each one of the plurality of retailers is operable to broadcast to a device the base service.

67. The computer program of claim 66, further comprising receiving subscription information associated with a subscription to content broadcasted by one of the plurality of retailers, wherein the custom attribute information is associated with the one retailer associated with the subscription information.

68. The computer program of claim 66, further comprising receiving the service attribute information corresponding to the base service for each of a plurality of base services, and wherein receiving the custom attribute information further comprises receiving custom attribute information for each of the service attribute information corresponding to each of the plurality of base services receivable by the device from at least a respective one of the plurality of retailers.

69. The computer program of claim 65, wherein generating further comprises replacing at least a portion of the service attribute information with a corresponding portion of the custom attribute information.

70. The computer program of claim 65, wherein the custom attribute information further comprises at least one of a channel icon, a channel weight, a name of a presentation, a description of the presentation, a reference to additional information about the presentation, a description of the reference to additional information, a rating associated with the presentation, and an indication of a type of device required to access the reference to additional information.

71. The computer program of claim 65, wherein generating further comprises generating a custom datacast presentation associated with a presentation.

72. The computer program of claim 65, wherein generating comprises associating the base service with an auxiliary service that broadcasts auxiliary presentations to supplement the base service.

73. The computer program of claim 72, further comprising presenting at least one of an intro, an outro, an advertisement, a barker, a universal resource locator (URL), and a datacast presentation as a supplement to the base service.

74. The computer program of claim 65, wherein receiving the custom attribute information further comprises receiving custom attribute information for each of a plurality of content retailers, and wherein generating the media presentation guide including the customized channel information further comprises replacing at least a portion of the service attribute information with a respective portion of the custom attribute information corresponding to the one of the plurality of content retailers broadcasting the corresponding base service to a device.

75. The computer program of claim 65, wherein generating further comprises generating the media presentation guide based on the custom attribute information.

76. The computer program of claim 65, wherein generating further comprises generating a customized presentation based on the custom attribute information.

77. The computer program of claim 65, wherein receiving the service attribute information corresponding to the base service further comprises receiving presentation-specific service attribute information for at least one of a plurality of presentations, wherein receiving the custom attribute information further comprises receiving presentation-specific custom attribute information for at least the one presentation, and wherein generating the media presentation guide including the customized channel information further comprises replacing the presentation-specific service attribute information with the presentation-specific custom attribute information for a corresponding presentation.

78. The computer program of claim 65, wherein generating further comprises generating a view of a combination of real-time media and non real-time media.

79. At least one processor for performing the actions of:
receiving via a broadcast service attribute information corresponding to a base service
receiving via a broadcast custom attribute information corresponding to the base service and to each one of a plurality of retailers, wherein the custom attribute information further defines the service attribute information;
applying the custom attribute information to the service attribute information in order to customize at least one of a plurality of channel information corresponding to the base service; and
generating a media presentation guide including the customized channel information based on combining the service attribute information with the custom attribute information associated with at least one of the content retailers.

80. A wireless device, comprising:
means for receiving via a broadcast service attribute information corresponding to a base service;
means for receiving via a broadcast custom attribute information corresponding to the base service and to each one of a plurality of retailers, wherein the custom attribute information further defines the service attribute information;
means for applying the custom attribute information to the service attribute information in order to customize at least one of a plurality of channel information corresponding to the base service; and
means for generating a media presentation guide including the customized channel information based on combining the service attribute information with the custom attribute information associated with at least one of the content retailers.

81. The wireless device of claim 80, wherein each one of the plurality of retailers is operable to broadcast to the wireless device the base service.

82. The wireless device of claim 81, further comprising means for receiving subscription information associated with a subscription to content broadcasted by one of the plurality of retailers, wherein the custom attribute information is associated with the one retailer associated with the subscription information.

83. The wireless device of claim 81, further comprising means for receiving the service attribute information corresponding to the base service for each of a plurality of base services, and wherein the means for receiving the custom attribute information further comprises means for receiving custom attribute information for each of the service attribute information corresponding to each of the plurality of base services receivable by the wireless device from at least a respective one of the plurality of retailers.

84. The wireless device of claim 80, wherein the means for generating further comprises means for replacing at least a portion of the service attribute information with a corresponding portion of the custom attribute information.

85. The wireless device of claim 80, wherein the custom attribute information further comprises at least one of a channel icon, a channel weight, a name of a presentation, a description of the presentation, a reference to additional information about the presentation, a description of the reference to additional information, a rating associated with the presentation, and an indication of a type of device required to access the reference to additional information.

86. The wireless device of claim 80, wherein the means for generating further comprises means for generating a custom datacast presentation associated with a presentation.

87. The wireless device of claim 80, wherein the means for generating comprises means for associating the base service with an auxiliary service that broadcasts auxiliary presentations to supplement the base service.

88. The wireless device of claim 87, further comprising means for presenting at least one of an intro, an outro, an advertisement, a barker, a universal resource locator (URL), and a datacast presentation as a supplement to the base service.

89. The wireless device of claim 80, wherein the means for receiving the custom attribute information further comprises means for receiving custom attribute information for each of a plurality of content retailers, and wherein the means for generating the media presentation guide including the customized channel information further comprises means for replacing at least a portion of the service attribute information with a respective portion of the custom attribute information corresponding to the one of the plurality of content retailers broadcasting the corresponding base service to the wireless device.

90. The wireless device of claim 80, wherein the means for generating further comprises means for generating the media presentation guide based on the custom attribute information.

91. The wireless device of claim 80, wherein the means for generating further comprises means for generating a customized presentation based on the custom attribute information.

92. The wireless device of claim 80, wherein the means for receiving the service attribute information corresponding to the base service further comprises means for receiving presentation-specific service attribute information for at least one of a plurality of presentations, wherein the means for receiving the custom attribute information further comprises means for receiving presentation-specific custom attribute information for at least the one presentation, and wherein the means for generating the media presentation guide including the customized channel information further comprises means for replacing the presentation-specific service attribute information with the presentation-specific custom attribute information for a corresponding presentation.

93. The wireless device of claim 80, wherein the means for generating further comprises means for generating a view of a combination of real-time media and non real-time media.

94. A wireless device, comprising:
a computer platform having a data repository comprising service attribute information received via a broadcast and custom attribute information received via a broadcast, the service attribute information and the custom attribute information corresponding to a base service and the custom attribute information corresponding to each one of a plurality of retailers, the custom attribute information further defining the base service; and
a media manager module on the computer platform and operable to apply the custom attribute information to the service attribute information in order to customize at least one of a plurality of channel information corresponding to the base service, and to generate a media presentation guide including the customized channel information based on combining the service attribute information with the custom attribute information associated with at least one of the content retailers.

95. The wireless device of claim 94, wherein each one of the plurality of retailers is operable to broadcast to the wireless device the base service.

96. The wireless device of claim 95, wherein the data repository further comprises subscription information associated with a subscription to content broadcasted by one of the plurality of retailers, wherein the custom attribute information is associated with the one retailer associated with the subscription information.

97. The wireless device of claim 95, wherein the service attribute information comprises service attribute information for each of a plurality of base services, and wherein custom attribute information further comprises custom attribute information for each of the service attribute information corresponding to each of the plurality of base services receivable by the wireless device from at least a respective one of the plurality of retailers.

98. The wireless device of claim 94, wherein the combination comprises overwriting the custom attribute information onto the service attribute information.

99. The wireless device of claim 94, wherein the custom attribute information further comprises at least one of a channel icon, a channel weight, a name of a presentation, a description of the presentation, a reference to additional information about the presentation, a description of the reference to additional information, a rating associated with the presentation, and an indication of a type of device required to access the reference to additional information.

100. The wireless device of claim 94, further comprising a user interface, and wherein the media manager module is operable to initiate a view comprising a custom datacast presentation associated with a presentation based on the combination.

101. The wireless device of claim 94, further comprising a user interface, wherein the custom attribute information comprises a auxiliary service, and
wherein the media manager module is operable to initiate a view comprising the base service supplemented with the auxiliary service based on the combination.

102. The wireless device of claim 101, wherein the auxiliary service comprises at least one of an intro, an outro, an advertisement, a barker, a universal resource locator (URL), and a datacast presentation as a supplement the base service.

103. The wireless device of claim 94, wherein the custom attribute information further comprises custom attribute information for each of a plurality of content retailers, and wherein the combination comprises replacing at least a portion of the service attribute information with a respective portion of the custom attribute information corresponding to the one of the plurality of content retailers broadcasting the corresponding base service to the wireless device.

104. The wireless device of claim 94, further comprising a user interface, and wherein the media manager module is operable to initiate a view comprising the media presentation guide based on the custom attribute information.

105. The wireless device of claim 94, further comprising a user interface, and wherein the media manager module is operable to initiate a view comprising a customized presentation based on the custom attribute information.

106. The wireless device of claim 94, wherein the service attribute information corresponding to the base service further comprises presentation-specific service attribute information for at least one of a plurality of presentations, wherein the custom attribute information further comprises presentation-specific custom attribute information for at least the one presentation, and wherein the combination comprises replacing the presentation-specific service attribute information with the presentation-specific custom attribute information for a corresponding presentation.

107. The wireless device of claim 94, wherein the media manager module is further for generating a view of a custom channel comprising a combination of real-time media and non real-time media.

108. An apparatus for providing content scheduling, comprising:
a content server comprising service attribute information and custom service attribute information, wherein the service attribute information corresponds to a base service operable to broadcast at least a portion of a presentation to a device and the custom service attribute information corresponds to an auxiliary service and each one of a plurality of content retailers and further defines the auxiliary service; and
a scheduler module operable to generate and transmit a system information message having at least one customized channel definition corresponding to at least one of the content retailers for transmission via broadcast to the device, wherein the customized channel definition comprises a replacement of at least a portion of the service attribute information with a corresponding portion of the custom service attribute information.

\* \* \* \* \*